(12) United States Patent
Kriven et al.

(10) Patent No.: US 6,887,569 B1
(45) Date of Patent: May 3, 2005

(54) HIGH TEMPERATURE TOLERANT CERAMIC COMPOSITES HAVING POROUS INTERPHASES

(75) Inventors: Waltraud M. Kriven, Champaign, IL (US); Sang-Jin Lee, Chonnam (KR)

(73) Assignee: The Board of Trustees of the University, Urbana, IL (US)

(*) Notice: Subject to any disclaimer, the term of this patent is extended or adjusted under 35 U.S.C. 154(b) by 0 days.

(21) Appl. No.: 10/145,845

(22) Filed: May 14, 2002

Related U.S. Application Data

(63) Continuation-in-part of application No. 09/692,931, filed on Oct. 20, 2000, now abandoned.
(60) Provisional application No. 60/160,598, filed on Oct. 20, 1999.

(51) Int. Cl.[7] ............................................. B32B 18/00
(52) U.S. Cl. ..................... 428/375; 428/367; 428/373; 428/378; 428/391; 428/688; 428/689; 428/701
(58) Field of Search ............................. 428/373, 375, 428/367, 378, 391, 688, 701, 683, 699; 427/376.2, 419.2, 419.3; 442/103

(56) References Cited

U.S. PATENT DOCUMENTS

| | | | |
|---|---|---|---|
| 5,110,771 A | 5/1992 | Carpenter et al. | 501/95 |
| 5,262,235 A | 11/1993 | Heaney, III | 428/373 |
| 5,645,781 A | 7/1997 | Popovic' et al. | 264/639 |
| 5,665,463 A | 9/1997 | Morgan et al. | 442/103 |
| 6,022,621 A | 2/2000 | McCarron, III et al. | 428/379 |

Primary Examiner—Deborah Jones
Assistant Examiner—Abraham Bahta
(74) Attorney, Agent, or Firm—Woodard, Emhardt, Moriarty, McNett & Henry LLP

(57) ABSTRACT

In general, this invention relates to a ceramic composite exhibiting enhanced toughness and decreased brittleness, and to a process of preparing the ceramic composite. The ceramic composite comprises a first matrix that includes a first ceramic material, preferably selected from the group including alumina ($Al_2O_3$), mullite ($3Al_2O_3 \cdot 2SiO_2$), yttrium aluminate garnet (YAG), yttria stabilized zirconia (YSZ), celsian ($BaAl_2Si_2O_8$) and nickel aluminate ($NiAl_2O_4$). The ceramic composite also includes a porous interphase region that includes a substantially non-sinterable material. The non-sinterable material can be selected to include, for example, alumina platelets. The platelets lie in random 3-D orientation and provide a debonding mechanism, which is independent of temperature in chemically compatible matrices. The non-sinterable material induces constrained sintering of a ceramic powder resulting in permanent porosity in the interphase region. For high temperature properties, addition of a sinterable ceramic powder to the non-sinterable material provides sufficiently weak debonding interphases. The ceramic composite can be provided in a variety of forms including a laminate, a fibrous monolith, and a fiber-reinforced ceramic matrix. In the laminated systems, intimate mixing of strong versus tough microstructures were tailored by alternating various matrix-to-interphase thickness ratios to provide the bimodal laminate.

54 Claims, 14 Drawing Sheets

HIGH TEMPERATURE TOLERANT CERAMIC COMPOSITES HAVING POROUS INTERPHASES

CROSS-REFERENCE TO RELATED APPLICATION

The present application claims the benefit of U.S. Provisional Application Ser. No. 60/160,598, filed on Oct. 20, 1999, and, is a continuation-in-part of U.S. patent application Ser. No. 09/692,931, filed on Oct. 20, 2000, abandoned which are hereby incorporated by reference herein in their entirety.

GOVERNMENT RIGHTS

The U.S. Government has paid-up rights in this invention and the right in limited circumstances to require the Patent Owner to license others on reasonable terms as provided by the terms of Contract No. ANL-981932401 awarded by the Department of Energy.

BACKGROUND

In general, this invention relates to a tolerant ceramic composite and to a process of preparing ceramic composites having enhanced flaw tolerance.

The brittleness and unreliability of ceramics remain difficult problems. Attempts to improve the flaw tolerance of ceramics by imparting "graceful failure," analogous to ductility in metals, have been partially successful with the use of ceramic composites. Certain ceramic composites have been made less brittle by allowing debonding at an interface (or within an interphase) between a ceramic matrix and a reinforcement, or between layers in ceramic laminates. Laminated composites such as silicon carbide (SiC)/graphite (C) and fibrous monoliths such as silicon carbide (SiC)/graphite (C) and silicon nitride ($Si_3N_4$)/boron nitride (BN) can be made less brittle by incorporating a weak interphase and a crack deflecting region. Other oxide systems based on monazite ($LaPO_4$) and the related xenotime ($YPO_4$) interphases have also emerged. More recently, transformation weakened interphases resulting from a stress-induced negative volume change in the ceramic oxide crystal structure in the interphases have been demonstrated to be a viable interphase debonding mechanism.

Porous ceramic composites have been prepared in an attempt to increase the flaw tolerance of ceramics. However, use of these porous ceramic composites as a means for enhancing the tolerance has presented several problems. For example, the pores eventually close from the continued sintering that occurs during prolonged operation at high temperatures. Porous mullite-alumina matrices reinforced with uncoated alumina fibers also show promising results for porous composites, which have relatively simple fabrication requirements. However, the extensive matrix porosity limits the overall mechanical strength of the material, and hence, its use in load-bearing applications.

Thus, there continues to be a need for tough flaw tolerant ceramic components and or processes of providing flaw tolerant ceramic components. This present invention addresses these needs and the above-described problems in a new and non-obvious way and provides a wide variety of additional benefits and advantages.

SUMMARY OF THE INVENTION

The present invention relates to flaw tolerant ceramic composites, the manufacture and use thereof. Various aspects of the invention are novel, nonobvious, and provide various advantages. While the actual nature of the invention covered herein can only be determined with reference to the claims appended hereto, certain forms and features, which are characteristic of the preferred embodiments disclosed herein, are described briefly as follows.

Generally, the present invention provides a tough, flaw-tolerant composite, which is relatively dense. Certain embodiments of this invention include an all-oxide ceramic composite, which is capable of sustained performance in an oxidizing environment. While not intending to be bound by any theory, it is thought that the use of the phenomenon of "constrained sintering" produces permanent porosity in an interphase, which should still be sufficiently weak to deflect a propagating crack. In this phenomenon, there are competing effects of grain growth versus densification that limit the complete densification of a two phase mixture, resulting in a rigid, but porous body.

In one form, the present invention provides a suitable mixture of ceramic particles and ceramic powder, constituting an interphase sufficiently weak and porous so as to be able to deflect a crack along the interphase in a composite. This results in macroscopic crack deflection and frictional work, leading to an overall toughening and flaw tolerance of the composite. This mechanism has the advantage that it is independent of temperature and can function at high temperatures, for example, up to at least about 1,700° C. in alumina-rich mullite ($2Al_2O_3.SiO_2$) or up to at least about 2,000° C. in a suitable matrix such as, for example, yttrium aluminate garnet ($Y_3Al_5O_{12}$ or "YAG"), yttria stabilized zirconia (such as a 3 mol % $Y_2O_3$—$ZrO_2$ or "3Y-TZP") nickel aluminate ($NiAl_2O_4$), celsian ($BaAl_2Si_2O_8$), and silicon aluminum oxy-nitride (SiAlON). The other salient feature of this design is that the porosity is relatively permanent, as opposed to the transient porosity achieved in current fiber-reinforced, porous interphases or matrices, which are made using a fugitive graphite phase.

In another form, the present invention provides toughened ceramic composites having at least two phases or microstructural regions, or matrices; a high strength, dense ceramic phase and a porous phase. Tape-casting and co-extrusion techniques are used to engineer a series of composites in laminated and fibrous monolithic configurations, respectively. Innovative modifications in design on the mechanical properties of the composites also provides sufficient enhancements to toughen the ceramic composites. These innovative modifications include a bimodal variation of matrix-to-interphase thickness ratio in the laminated composites. In the fibrous monoliths, a triple layer, repeating unit consisting of "core-interphase-matrix," are fabricated, which ensures that there is no continuous weak path through the composite designed into the microstructure.

In another form, the present invention provides a composition that comprises a first matrix, which includes a first ceramic material, and an interphase region. The interphase region includes ceramic particles. In certain embodiments, the first ceramic material can be selected to include ceramic aluminides, ceramic borides, ceramic carbides, ceramic nitrides, ceramic oxides, and ceramic silicides. Ideally these ceramic materials are selected to be chemically compatible in that they do not appreciably change their chemical composition during processing or in use. More preferably, the first ceramic material is selected to include ceramic oxides; still more preferred, the ceramic oxide is selected from the group consisting essentially of alumina, mullite, yttrium aluminate garnet (YAG), yttria stabilized zirconia, nickel aluminate, celsian, and chemically compatible mixtures thereof. The ceramic particles in the interphase region are preferably selected from ceramic particles having a substantially uniform shape, and which are randomly oriented in the interphase region. The interphase region is also provided to include voids or pores between the ceramic particles. In addition or in the alternative, the ceramic particles preferably are formed of ceramic crystals, which have a high aspect ratio.

In yet another form, the present invention provides a ceramic composite comprising a first matrix that includes a first ceramic material and an interphase region that includes randomly oriented, ceramic particles. The randomly oriented ceramic particles are selected to be substantially non-sinterable. The interphase region is formed to include voids or pores. The ceramic composite can be provided in a variety of configurations including a laminate, a bimodal multimodal laminate, a fibrous monolith, and a fiber-reinforced ceramic matrix.

Yet another form of the present invention provides a process of preparing a ceramic composite having enhanced toughness. The process comprises providing a first matrix of a first ceramic oxide material, contacting the first matrix with an interphase region, which comprises randomly oriented, ceramic particles that are substantially non-sinterable and have a substantially uniform shape to provide a green ceramic composite; and sintering the green ceramic composite. The process of preparing the ceramic composite also comprises calcining the green composite and sintering the first ceramic oxide at a temperature between about 1,000° C. and about 2,000° C.

One object of this invention is to provide a high temperature tolerant ceramic composite exhibiting increased toughness.

Further objects, features, aspects, forms, advantages and benefits shall become apparent from the description and drawings contained herein.

DETAILED DESCRIPTION OF THE INVENTION

Figure 1:
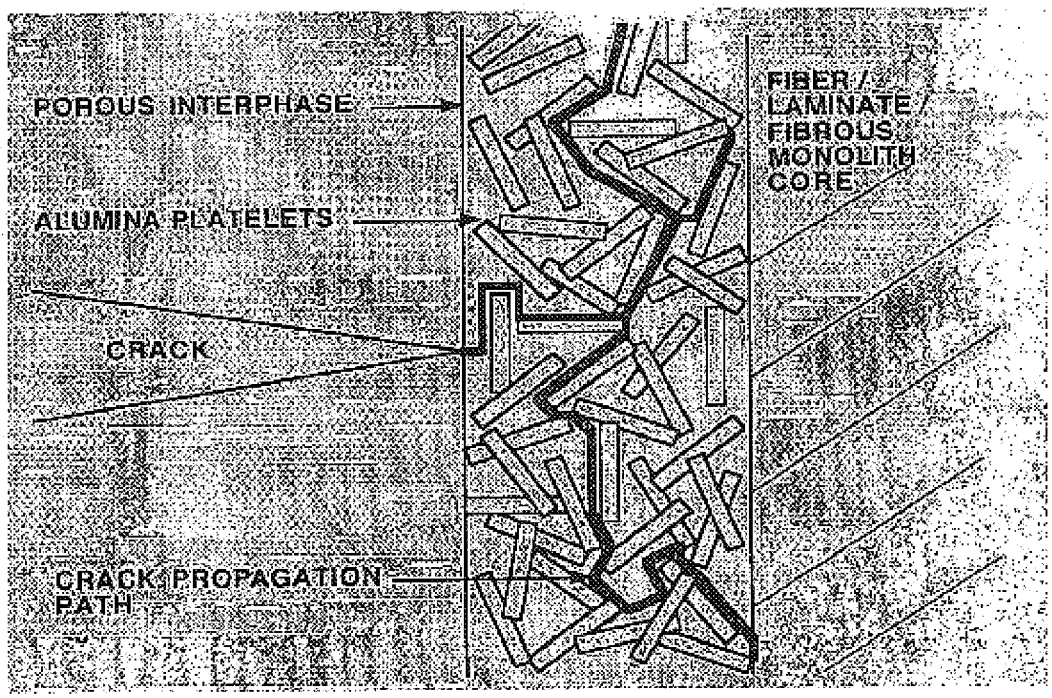
FIG. 1 is a schematic illustration of proposed crack deflection mechanism in the composite containing porous alumina platelet weak interphases. The illustrated mechanism can include synergistic, energy dissipating mechanisms of crack deflection, grain bridging and crack blunting.

For the purposes of promoting an understanding of the principles of the invention, reference will now be made to the embodiments illustrated herein and specific language will be used to describe the same. It will nevertheless be understood that no limitation of the scope of the invention is thereby intended. Any alterations and further modifications in the described processes, systems or devices, and any further applications of the principles of the invention as described herein, are contemplated as would normally occur to one skilled in the art to which the invention relates.

In general, the present invention is directed to a ceramic composite that exhibits enhanced toughness and flaw tolerance. In preferred forms, the ceramic composite is stable in air or other oxidizing environments and exhibits increased strength and resists fracture even at elevated temperatures. The preferred ceramic composite includes a first matrix that comprises a first ceramic material, and an interphase region that comprises ceramic particles. The interphase region is provided to include permanent voids or pores dispersed throughout the region. The ceramic composite can be provided in a variety of configurations, including simple laminates, multimodal laminates, fibrous monoliths, and fiber-reinforced matrices. The ceramic composites of this invention can also include additional matrices. The additional matrices can be provided as fibers, additional matrix layers or additional interphase layers. Further, the additional matrices can include ceramic components that are the same as the first ceramic material and/or ceramic particles or different from the first ceramic material and/or ceramic particles. This invention also includes a process for preparing a ceramic composite having a first matrix and a porous interphase region.

The ceramic composition includes a first matrix that comprises a first ceramic material. Preferably, the first ceramic material is selected to be chemically stable at elevated temperatures and in oxidizing environments. The first ceramic material can be provided in a wide variety of ceramic compositions, including stoichiometric compositions that comprise ceramic aluminides, ceramic borides, ceramic carbides, ceramic oxides, ceramic nitrides, ceramic silicides, and ceramic solid solutions. Preferably the first ceramic materials selected to be chemically compatible in that they do not appreciably change their chemical composition during processing or in use. The first ceramic material can also be selected to include ceramic solid solutions, for example, yttria stabilized zirconia. Preferably, the first ceramic material is provided as a ceramic oxide. Still more preferably, the ceramic material includes alumina, mullite, yttrium aluminate garnet (YAG), yttria stabilized zirconia, nickel aluminate, celsian, silicon aluminum oxy-nitride (SiAlON) and chemically compatible mixtures thereof.

The ceramic composition includes an interphase region that includes ceramic particles. The interphase region is provided to exhibit an essentially permanently porous region in the ceramic composite. By essentially permanent porous region, it is understood that the interphase region does not densify or sinter to a significant extent at elevated temperatures. While maintaining the essentially permanent porosity, the ceramic particles can exhibit a certain degree of "necking" or bridging between surfaces of adjacent particles. Further, inclusion of an additional ceramic component to the interphase region can form an interconnected ceramic matrix that includes the ceramic particles while maintaining the essentially permanently porous characteristic of the interphase region. The average particle size of the additional ceramic component can be selected to be either larger or smaller than the average particle size of the ceramic particles. When an additional ceramic component is included in the interphase region, it is preferable that the particle size of the additional component be less than or equal to the particle size of the ceramic particles, if the intent be to strengthen the interphase. If the intention be to retard densification, the added particles may be larger than the platelets in the interphase.

The interphase region comprises ceramic particles, which are preferably provided in a substantially uniform shape, for example, as discrete crystals. By substantially uniform shape, it is understood to mean that the particles exhibit a recurring shape or pattern of shapes. The substantially uniform shapes or pattern of shapes are not required to be symmetrical. However, the substantially uniform shapes are randomly oriented in the interphase region and provide the interphase region with the desired degree of porosity. Preferably, the ceramic particle is selected to include alumina platelets. In an alternative form, the second ceramic region can include uniformly shaped reinforcing material such as fibers, whiskers, and crystals that are chemically compatible with the ceramic material and are non-sinterable. The reinforcing material is provided in the interphase region in a randomly oriented fashion to form essentially permanently retained pores.

In preferred embodiments, the ceramic particles are selected to exhibit a high aspect ratio, i.e., a height-to-thickness ratio. Preferably, the ceramic particles on average are provided to have an aspect ratio of about 2.5:1 to about 3:1; more preferably, the ceramic particles have an aspect ratio of about 5:1 to about 10:1.

The ceramic particles additionally exhibit non-sinterable behavior at elevated temperatures. In a preferred form, the ceramic particles are selected to be non-sinterable at temperatures of at least about 1,500° C., more preferably at least about 1,700° C. Still more preferably, the ceramic particles are selected to be non-sinterable at temperatures of at least 2,000° C.

The interphase region can include a second or additional ceramic component(s). Preferably (but not required), the interphase region includes ceramic components that are used in the first ceramic matrix. In one embodiment, the additional ceramic component is selected to be the same composition as the first ceramic material. In other embodiments, the additional ceramic material is selected to be different from the first ceramic material. Varying the amount of the ceramic component in the interphase region varies the strength of the region. The additional ceramic component can be included in the interphase region in an amount sufficient to enhance the strength of the ceramic composite. More preferably, the additional ceramic component can be included in the interphase region in amounts ranging up to about fifteen weight percent (15 wt %), or up to about thirty five weight percent (35 wt %) or even up to about eighty five weight percent (85 wt %), depending on required high temperature properties. Alternatively, the additional ceramic component is included in the range between about 1 vol % and about 10 vol %; still yet more preferably, in amounts ranging between about 1 vol % and about 3 vol %. In preferred embodiments, the additional ceramic component can be selected to be the first ceramic material. In this embodiment, sintering the ceramic composite provides necking between ends of the ceramic particles. However, the ceramic particles remain substantially non-sintered. Thus, the interphase region exhibits substantial the porosity even at elevated temperatures.

The ceramic composite of the present invention can be provided in a variety of forms, including laminates, bimodal laminates, fibrous monoliths, and continuous fiber-reinforced composites. Typically, laminates of the ceramic composite are fabricated by a tape-casting process. Slurries of the desired ceramic components are prepared according to known procedures. The slurries of the ceramic powders are tape-cast using a doctor blade to obtain tape-cast green sheets of varying thickness. After drying, the cast tapes laminate composites are prepared by stacking dry cast tapes in the desired pattern. The remaining volatile components are removed at elevated temperatures to provide a green laminated body. The green laminated bodies are then pressureless sintered at elevated temperature, preferably at temperatures of at least 1,600° C. for about 1 to about 10 hours.

By use of the term multimodal laminate in this invention, it is to be understood that each of three or more layers in the composite can have a thickness that deviates from the other layers or from a constant thickness. Similarly, the term bimodal laminate is to be understood to mean that each of the two layers in the composite can have a thickness that deviates from each other or from a constant thickness. Additionally, in preferred embodiments, the layers in the multimodal or bimodal laminates have the same or similar composition.

A bimodal laminate can be fabricated by methods similar to that described for the laminate ceramic composite. A preferred bimodal ceramic composite is provided with one or more layers of a high matrix-to-interphase thickness ratio (high strength), alternating with one or more, preferably several, regions of a low matrix-to-interphase thickness ratio (high toughness).

Alternatively, for ease in processing, the bimodal ceramic composite, the high matrix-to-interphase thickness ratio can be substituted by a collection of low matrix-to-interphase thickness ratio laminates, where the interphase has been strengthened by extra additions of sintering matrix powder to the interphase. A further extrapolation for tunable interphase strengths to operate over a wide temperature range would be to vary the amount of matrix sintering powders to the debonding interphase. This is anticipated to counteract slippage and creep of platelets in the interphase under loadings at higher temperatures.

This invention also includes fibrous monoliths. Since fibrous monoliths include concentric layers, and as such, for the purposes of this invention they are classified as laminates. Fibrous monoliths have been formed using conventional techniques. Such methods are well known in the art. Typically, a ceramic powder paste is prepared by milling a ceramic material and blending a desired polymer and the resulting ceramic powder in a suitable solvent, such as ethylene vinyl acetate. The ceramic powder paste is then warm-pressed into thin layers to a desired thickness. The first layer is then rolled or pressed into a cylinder or feeder rod, preferably having a diameter of about 14 to about 20 mm to provide a ceramic core for the fibrous monolith. A second ceramic powder paste, which included the ceramic particles, is prepared in a similar fashion except the ceramic particles are not milled. The resulting ceramic particulate paste is warm pressed into a second thin layer. The second layer is wrapped around the ceramic core. Similarly, a third layer that includes the desired first ceramic material is prepared. This third layer is then wrapped around the second layer. The resulting green, cylindrical body is packed into an extrusion block and warm extruded through the orifice of a spinneret at elevated temperatures. The resulting green extruded, layered filament from the orifice of the spinneret is then cut into short segments. The short segments are packed tightly into the extrusion block and co-extruded again. The resulting extrusion process can be repeated as many times as desired to provide a green, fibrous monolith composite. The green fibrous monolith composite is then subjected to calcining process and then isostatically cold-pressed at about 250 MPa to about 450 MPa pressure.

Bend bar samples prepared from the ceramic composite configurations described above were subjected to flexural testing. Both the load for fracture and the deflection of the bend bars under the load were measured. It was determined that the resulting ceramic composites exhibited high strength and an unusual and unexpected plastic-like behavior, retaining significant load-bearing capability after initial step-wise load drops were observed. The results amply demonstrate that ceramic composites formed in a variety of configurations which contained permanently porous interphases, exhibited enhanced toughness and flaw tolerance.

For the purpose of promoting further understanding and appreciation of the present invention and its advantages, the following Experimental Procedure is provided. It will be understood, however, that the examples provided in the Experimental Procedure are illustrative and not limiting in any fashion.

Experimental Procedure (1) Fabrication of Mullite and Alumina Laminates

Laminates of mullite and alumina were fabricated by the tape-casting process. Mullite powder (KM Mullite-101, Kyoritsu Inc., Nagoya, Japan), alumina powder (A16SG, Alcoa, New Milford, USA) and alumina platelets (Atochem, Pierre-Bénite, France) were used. The slurries for tape-casting consisted of ~30 vol % oxide powders, ~55% solvent and ~15 vol % organics. Polyvinyl butyral (PVB, Monsanto Inc., St. Louis, Mo., USA) was added to the slurries in 0.5 wt % amount, as a dispersant. The solvent was composed of mixtures of toluene (Aldrich Chemical Co., Milwaukee, Wis., USA), n-butyl alcohol (Aldrich Chemical Co., Milwaukee, Wis., USA), and ethanol (Aldrich Chemical Co., Milwaukee, Wis., USA). The approximate mixing ratio of toluene, n-butyl alcohol and ethanol was 20 vol %, 20 vol % and 60 vol %, respectively. The organics included polyvinyl butyral (PVB) as a binder, and polyethylene glycol (PEG) 2000 and dioctyl phthalate (DP) (Aldrich Chemical Co., Milwaukee, Wis., USA) as plasticizers. The relative additions of the organics were 50 wt % binder to 50 wt % plasticizer. After pulverization of the slurry, the binder and plasticizers were added and ball-milled for 24 h. In the case of the alumina platelet slurry, the mixing was done by just stirring for 24 h, instead of ball-milling, to prevent breaking of the platelet morphology. The slurries were stirred in a vacuum to remove bubbles and to adjust the working viscosity. After aging for one day, the slurries were tape-cast using a doctor blade opening of 130–300 $\mu$m to obtain tape-cast green sheets of 50–150 $\mu$m thickness. Drying of the cast tapes was carried out under a saturated solvent atmosphere for one day.

The green laminate composites had area dimensions of 25 mm×51 mm after stacking the green sheets alternatively. Thermocompression was performed under 10 MPa loading for 10 min at 80° C., which was the softening point of the organics. Subsequently, the organic additives were removed by heating to 600° C. in air, with a 1° C./min heating rate. After the burnout process, the laminated green bodies were isostatically cold pressed at 270 MPa for 50 min and then pressureless sintered at 1600° C. for 10 h or 2 h, for the densification of mullite or alumina matrices, respectively.

After co-firing, the densified laminates were cut into bend-bars. The cutting direction was along the longitudinal axis of the specimens in the plane of the lamination. The bend bars with dimensions of 30 mm length×4.0 mm thickness× 3.0 mm width were tested in three-point flexure, without any surface polishing of the bend-bar specimens.

(2) Fabrication of Fibrous Monoliths

The conventional fibrous monolithic forming method was adopted[40] but with some modification to include a specific burnout process as well as a post burnout cold isostatic pressing (CIP) step. The first step in the fabrication of fibrous composites was to batch the respective polymer and ceramic powder in a high-shear, twin-roll mixer (C. W. Brabender Instruments, Inc., South Hackensack, N. J., USA). In preparing fibrous ceramics, a 30–40 vol % polymer and 70–60 vol % ceramic powder paste was prepared from DuPont's ethylene vinyl acetate (Elvax 470™, a co-polymer thermoplastic, $T_s$=120° C., $\rho$=0.94 g/cm$^3$, DuPont, Orange, Tex., USA), drops of polyethylene glycol 200 (Aldrich Chemical Co., Milwaukee, Wis., USA) plasticizer, and the ceramic powders (alumina for matrix and alumina platelets for interphase). The ceramic powders and polymers were loaded into the shearing chamber which was electrically heated to 150° C. High-shear mixing began with the viscosity of the resulting paste being monitored as a function of time.

After paste formulation, the next step was to warm press the alumina platelet paste into relatively thin, weak layers for use as cell boundaries in the fibrous composite. Alumina matrix sheets were also warm pressed (Carver Press, Fred S. Carver, Inc., Menomonee Falls, Wis., USA) to a predetermined thickness based on the desired thickness ratio between the alumina matrix and the platelet interphase. The pastes were pressed at 140° C. under 130 MPa for 1 min. Hardened past pieces of alumina were also loaded into a cylinder assembly having an inner diameter of 16 mm. Formation of the alumina feeder rod via compression molding by an Instron universal testing machine (Model 4502, Instron Corp., Canton, Mass. USA) was carried out between 1–3 MPa, with ram speed monitored at 20 mm/sec, with the extrusion temperature set at 145° C.

Once formed, the alumina platelet cell boundary and alumina matrix layers were incorporated into the microstructure. These layers were applied by wrapping the warm pressed sheet around the alumina feeder rod; first the platelet layer, followed by the alumina matrix layer. Once tightly wrapped, the green body was warm extruded through a 2 mm orifice at 5 mm/sec ram, with the extrusion temperatures set at 140° C. As the green layered filament came through the orifice of the spinneret, it was cut and then packed tightly into the extrusion block. A second warm extrusion pass was then conducted through the same spinneret. The exiting filament was collected and cut into 2 inch segments to be laid up in a rectangular mold, and then warm pressed at 140° C. under 27 MPa into a billet.

The organic additives were removed by heating to 700° C. for 5 h in an air atmosphere, with a slow heating schedule (0.1° C./min) at the range of 120–200° C. After the burnout process, the samples were isostatically cold pressed at 270 MPa for 5 min and then pressureless sintered at 1600° C. for 2 h. The sintered samples were cut and tested in flexure in the same way as mentioned for the lamination process.

(3) Characterization (A) Flexural testing: 3-point flexural testing at room temperatures was performed with bend-bar samples using a 20 mm span length, at a crosshead speed of 0.01 mm/min on a universal testing machine (Model 4502, Instron Corp., Canton, Mass. USA). The apparent work of fracture (WOF) was obtained by dividing the area under the load displacement curve by the cross-sectional area of the sample. The relative WOF's can be compared, since the specimens had essentially the same dimensions. The exceptions were some specimens which had different dimensions, as indicated at the bottom of the respective tables summarizing the mechanical property data. (See Tables I–III below.)

TABLE I

Variation of Strength and Work of Fracture for Mullite Matrix Laminates according to Mullite Content in the 10–15 μm Alumina Platelet Interphases.

| Mullite content (vol %) | 0 | 1 | 3 | 5 | 10 | 20 |
|---|---|---|---|---|---|---|
| Thickness ratio§ | 2:1 | 4:1 | 6:1 | 2:1 | 2:1 | 2:1 |
| Flexural strength (MPa) | 70 | 77 | 88 | 86 | 97 | 128 |
| Work of fracture (kJ/m²)† | 0.4 | 0.6 | 0.6 | 0.4 | 0.4 | 0.4 |

§densified matrix: interphase
†For specimen dimensions of 30 mm × 4.0 mm × 3.0 mm.

TABLE II

Variation of Strength and Work of Fracture for Laminates according to Thickness Ratio Between Mullite Matrix and 10–15 μm Alumina Platelet Interphases.

| Thickness ratio§ | 2:1 | 6:1 | 4:1 | bimodal¥ |
|---|---|---|---|---|
| Mullite content (vol %)† | 0 | 0 | 1 | 1 |
| Flexural strength (MPa) | 70 | 75 | 77 | 102 |
| Work of fracture (kJ/m²) | 0.5 | 0.6 | 0.6 | 1.1 |

§densified matrix: interphase
¥alternative combination of 3:1 ratio and 9:1 ratio; and a specimen size of 30 mm × 4.5 mm × 3.0 mm, (rather than the normal 30 mm × 4.0 mm × 3.0 mm).
†mullite content in the alumina platelet interphase

TABLE III

Variation of Strength and Work of Fracture for Laminates According to Thickness Ratio Between Alumina Matrix and Alumina Platelet (10–15 μm) Interphases.

| Thickness ratio§ | 6:1 | bimodal¥ | 15:1 |
|---|---|---|---|
| Mullite content (vol %)† | 1 | 3 | 2 |
| Flexural strength (MPa) | 105 | 112 | 123 |
| Work of fracture (kJ/m²) | 1.1 | 2.1 | 1.5 |

§densified matrix: interphase
¥alternative combination of 5:1 ratio and 12:1 ratio, and a specimen size of 30 mm × 4.5 mm × 3.0 mm, (rather than the normal 30 mm × 4.0 mm × 3.0 mm).
†mullite content in the alumina platelet interphase (B) Microstructure Characterization: The microstructure of the platelet powders, surfaces of the sintered samples, as well as their side view and fracture surfaces after bend testing were observed by scanning electron microscopy (SEM, Model DS-130, International Scientific Instruments, Santa Clara, Calif., USA). The bend-bar specimens were mounted on an aluminum stub and Au—Pd sputtered.

III. Results (1) Microstructure of Platelets and Interphase

Figure 2A:
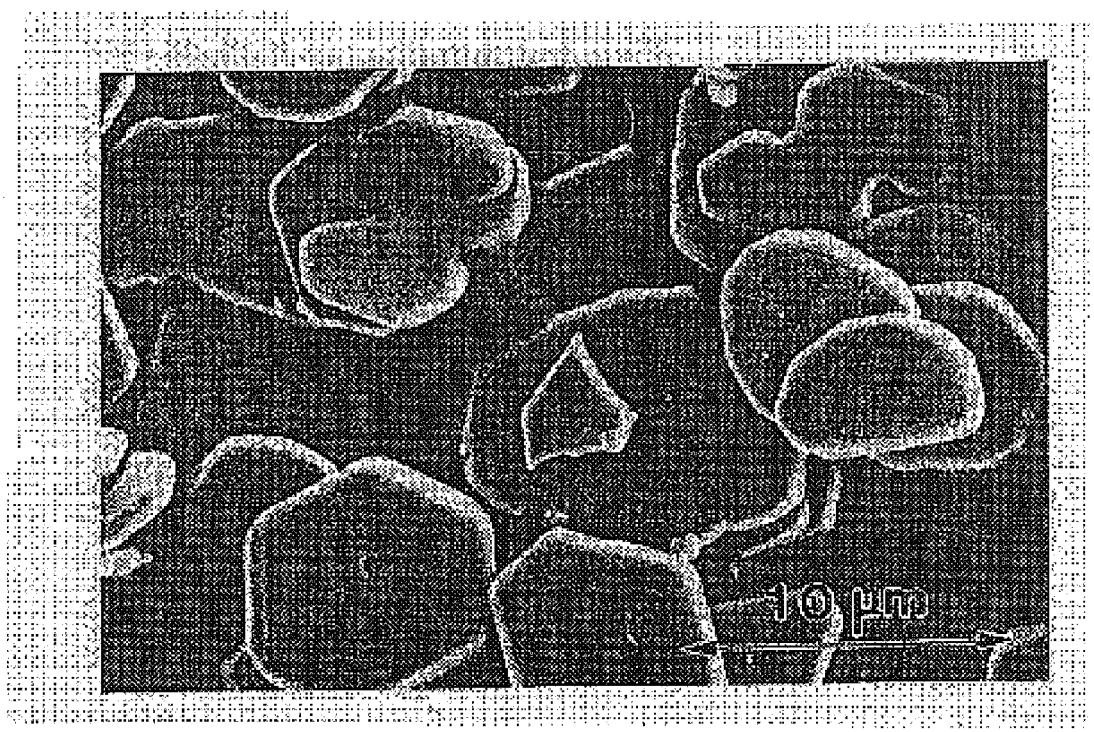
FIGS. 2a and 2b are a scanned images of the morphology of alumina platelet powders of 2a 5–10 μm and 2b 10–15 μm in size for use in one embodiment of the present invention.
Figure 2B:
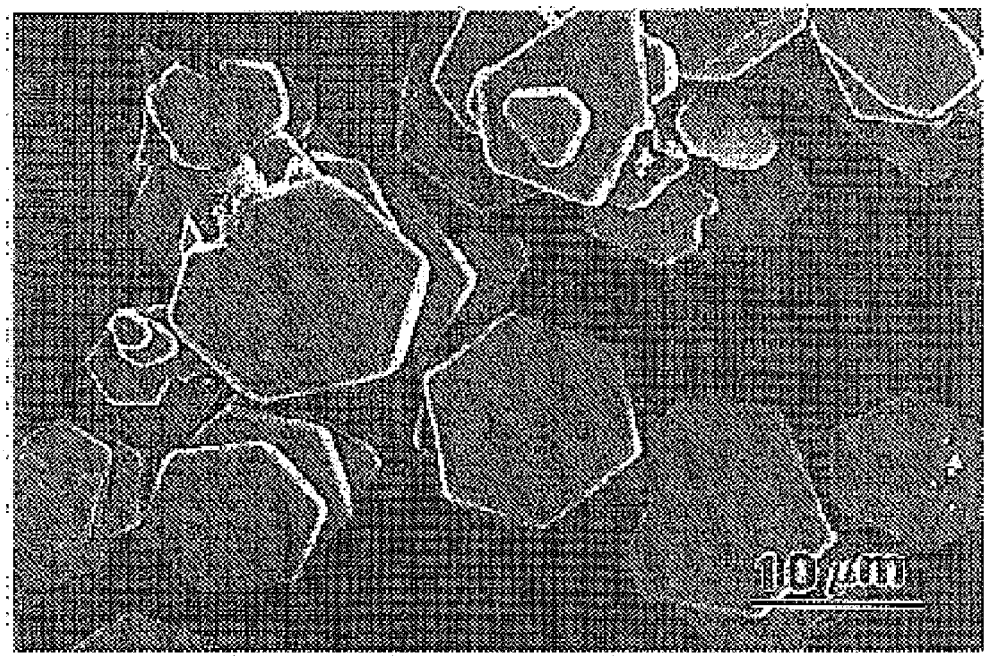
Figure 3A:
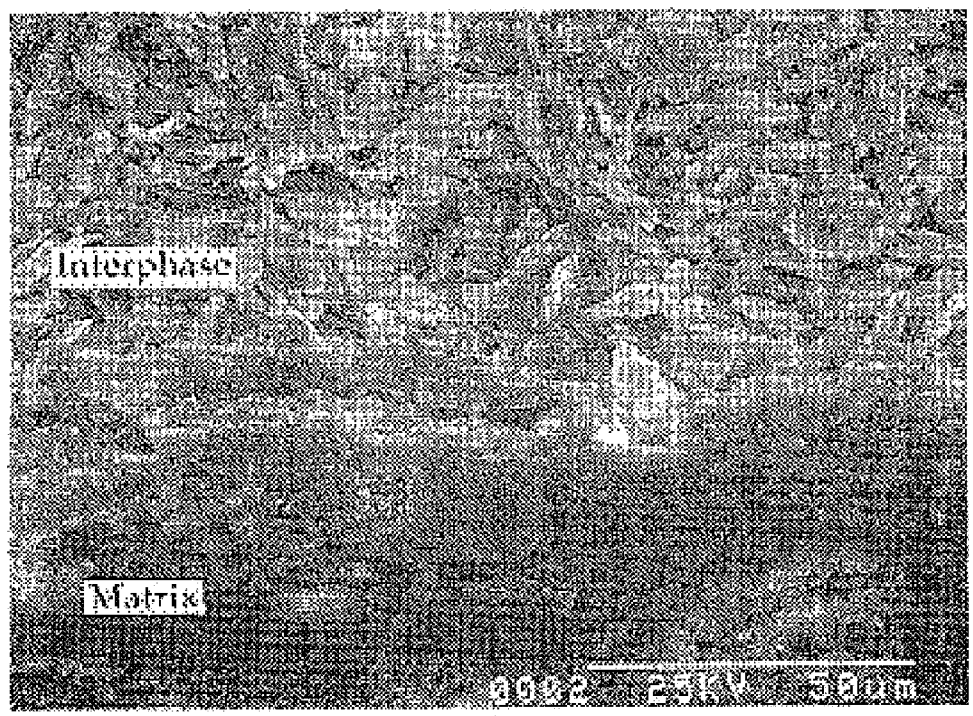
FIGS. 3a and 3b are a scanned images of SEM micrographs for 3a cross section and 3b crack profile of one embodiment of a ceramic composite of the present invention with alumina platelet-weakened interphases.
Figure 3B:
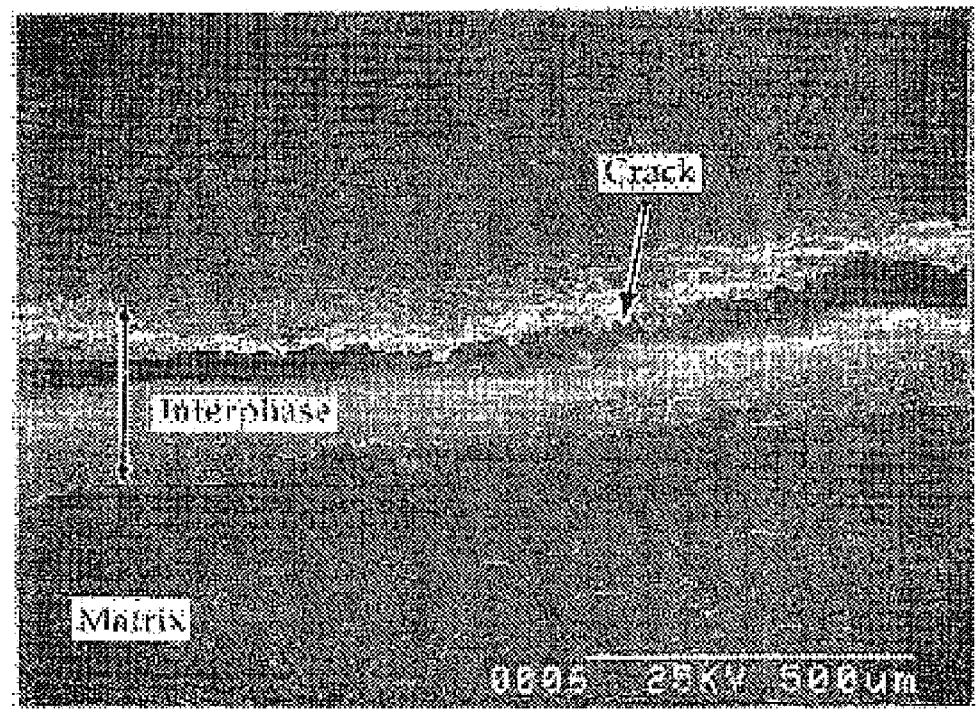

The typical morphology of the alumina platelets is seen in the SEM micrograph of FIGS. 2a and 2b. The platelets were hexagonal crystals of approximately 1 μm thickness and diameters in the relatively narrow size distribution ranges of 3–5 μm, 5–10 μm, 10–15 μm, and 20–25 μm. In this study, the 5–10 μm and 10–15 μm were found to be useful size ranges. The surfaces of the platelets were sometimes pitted in the middle, but relatively free of pits on the outer surfaces. FIGS. 3a and 3b are representative micrographs of a laminated mullite matrix with the alumina platelet interphase. The platelets were randomly oriented and clearly showed a non-sintered, porous microstructure (FIG. 3(a)). However, the interfacial region between the mullite matrix and platelet phase was relatively densified. After fracture testing, crack deflection along the porous region at the center of the interphase was observed (FIG. 3b).

Figure 4:
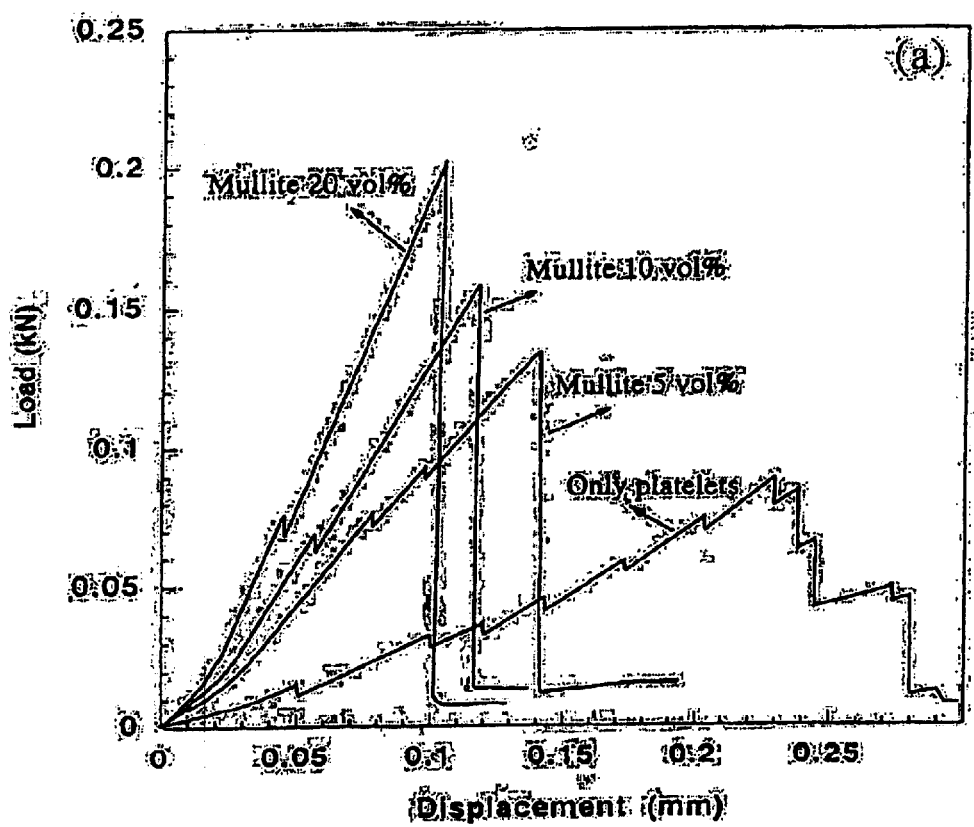
FIG. 4 is a graph illustrating load-deflection curves of mullite-matrix laminate composites, prepared according to the present invention, as a function of mullite content in the weak interphases. The laminates have 10–15 μm alumina platelets in the interphases and 2:1 thickness ratio between matrix and interphase (Table I).
Figure 5:
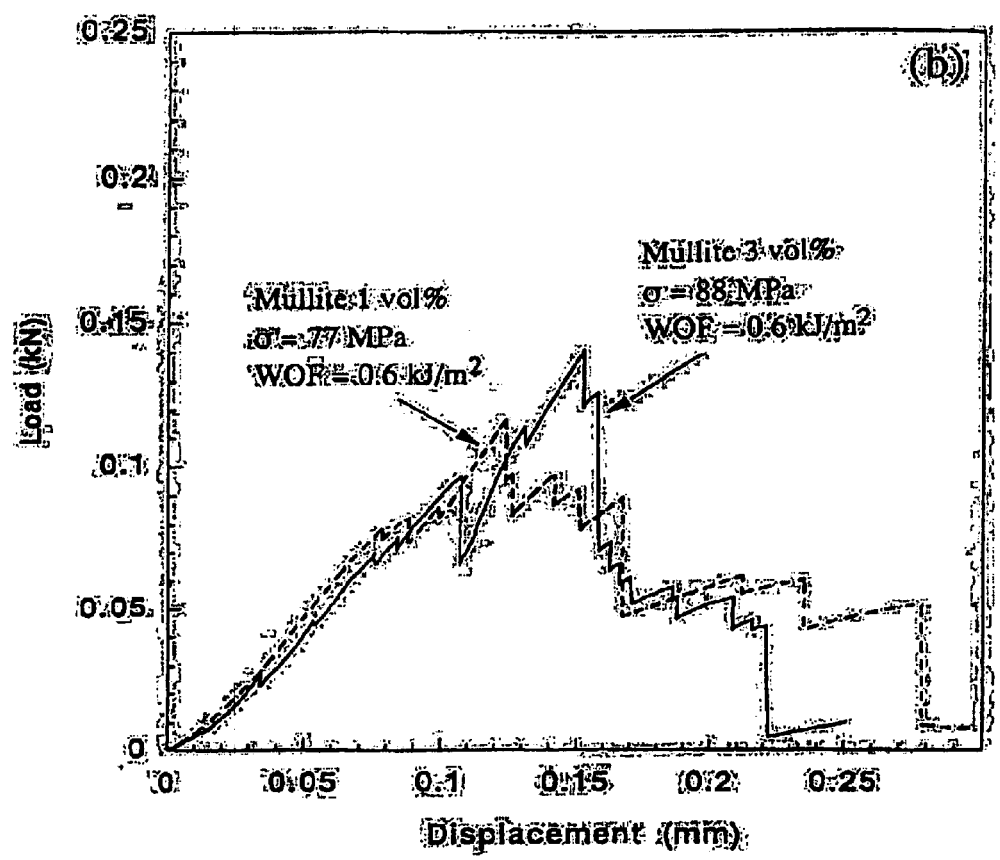
FIG. 5 is a graph illustrating load-deflection curves of one embodiment of mullite-matrix laminate composites, prepared according to the present invention, as a function of mullite content in the weak interphases. The laminates have 10–15 μm alumina platelets in the interphases and 4:1 and 6:1 thickness ratio between matrix and interphase, respectively.

(2) Fracture Behavior of Mullite Laminates According to Mullite Content in the Interphase The results of flexural testing for the mullite matrix laminates, having a variable mullite content in the alumina platelet interphases, are listed above in Table I. It is seen that as the interphase mullite content increased, so also did the strength increase. This was attributed to a denser, albeit still porous microstructure, formed during sintering. FIGS. 4 and 5 present load vs deflection curves for mullite laminates as a function of interphase mullite content. In FIG. 4, the mullite-matrix laminate composites have 10–15 μm alumina platelets in the interphase and 2:1 thickness ratio between the matrix and interphase (see Table I). The 5, 10 and 20 vol % mullite-content bend-bars produced fracture curves with only a few steps before failure (FIG. 4). The step-wise load drops are characteristic of graceful failure and indicate crack deflection and debonding at the interphase. The mullite-matrix laminate composites have 10–15 μm alumina platelets in the interphase and 4:1 and 6:1 thickness ratio between the matrix and interphase (see Table I). Slightly more steps were observed in the laminates which had less than 5 vol % mullite content in the interphase (FIG. 5). The laminate that had no mullite content had the most steps in its load vs displacement curve, in contrast to the laminates that had greater than 5 vol % mullite content (FIG. 4). However, the strength of the laminate containing no mullite powder in the interphase was rather low. It is noticed that the work of fracture at room temperature decreased above 5 vol % additions of mullite (despite thicker interphases, and hence more likely crack deflection along the interphase) than in laminates having 1 and 3 vol % mullite content in the interphase. This implies that at room temperature, interphases having greater than 5 vol % mullite content might not have been weak enough for crack deflection to occur at room temperature.

Figure 6A:
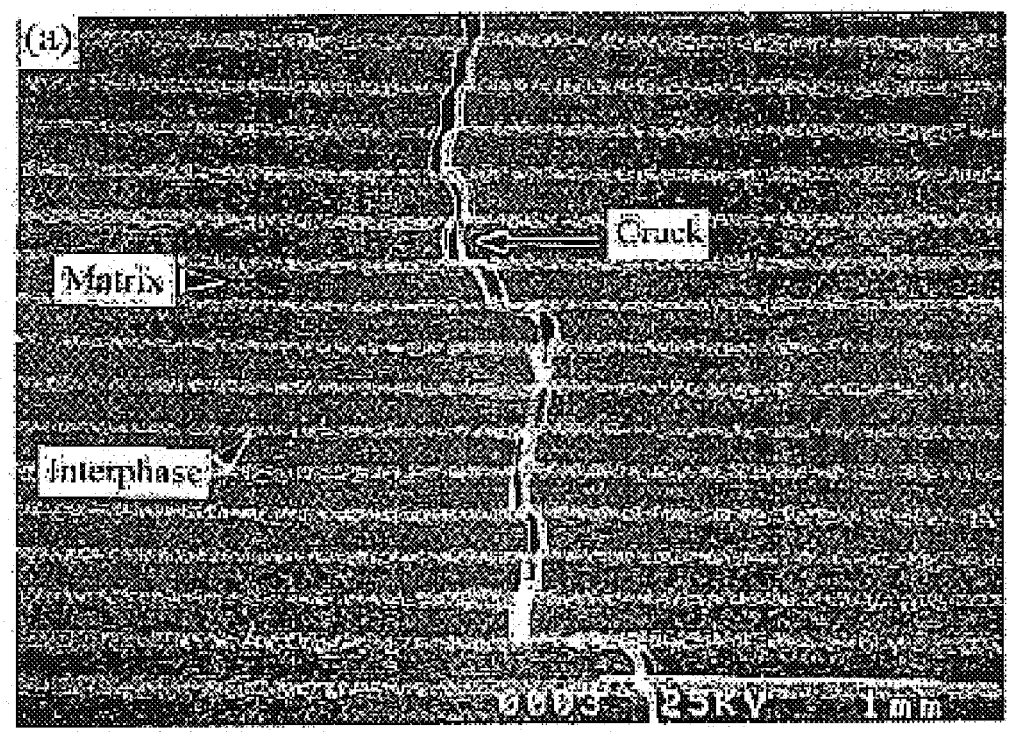
FIGS. 6a and 6b are scanned images of SEM micrographs for the failed side view of a laminate composite prepared according to the present invention having 6a 5 vol % and 6b 3 vol % mullite content in the interphases.
Figure 6B:
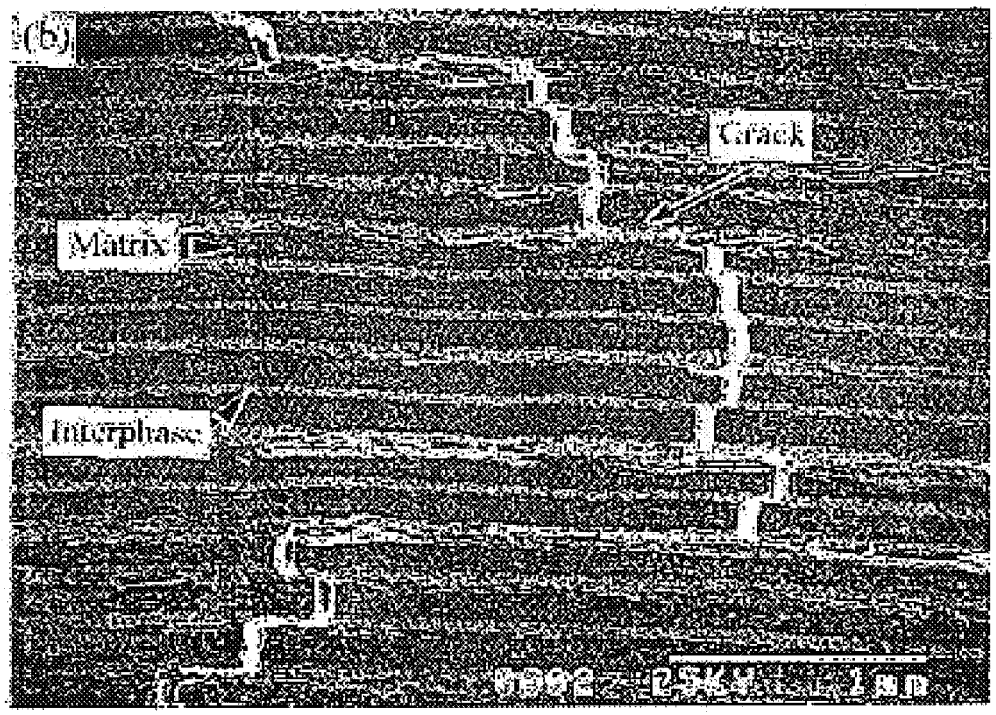

Micrographs of the tensile (failed) side view of the 5 vol % and 3 vol % mullite-content laminates are shown in FIGS. 6(a) and 6(b), respectively. In the 3 vol % interphase mullite-content specimen, the crack deflection noticeably proceeded along the weak alumina platelet interphase, despite the interphase layers being relatively thin. This observation implies that the crack deflection is strongly dependent on the microstructure of the porous interphase rather than on the thickness of the interphase.

Figure 7:
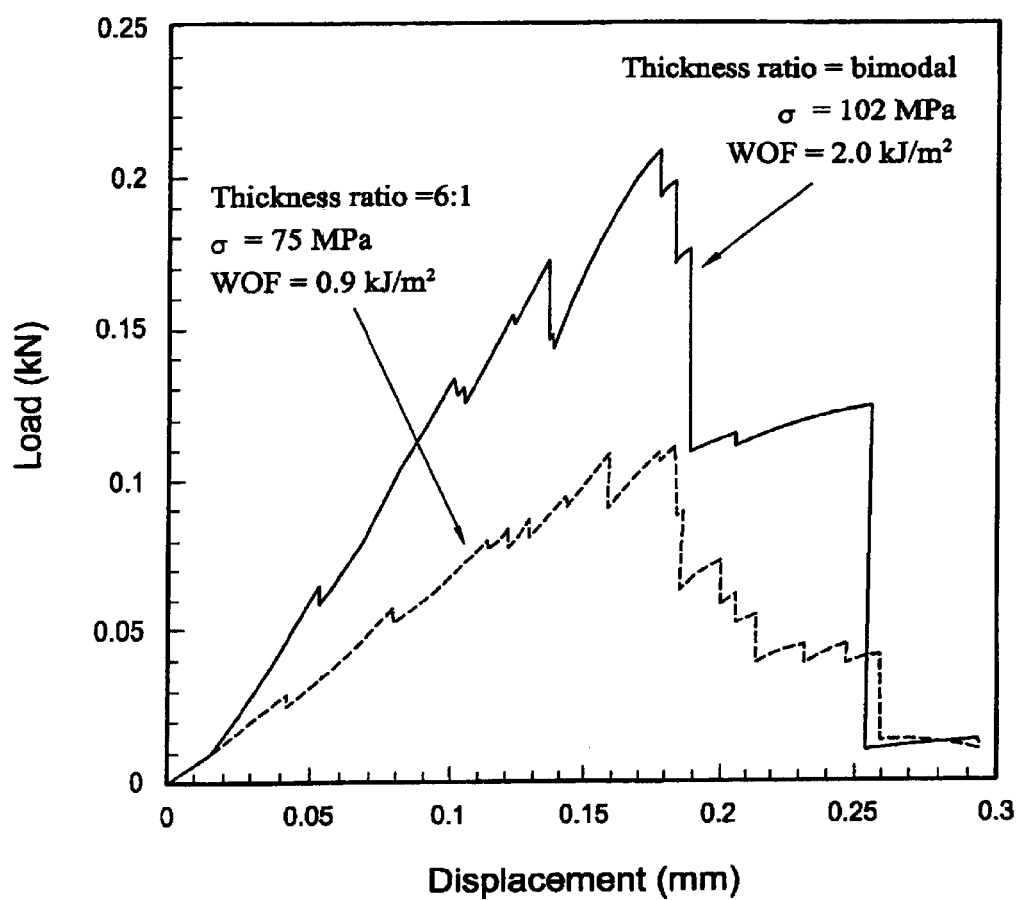
FIG. 7 is a graph illustrating load-deflection curves of two mullite-matrix laminate composites, prepared according to the present invention, as a function of thickness ratio between the matrix and interphase. The laminates have 10–15 μm alumina platelets in the interphase region and either 0 or 1 vol % mullite content in the interphases. The bimodal design has an alternative combination of 3:1 ratio and 9:1 ratio.

(3) Fracture Behavior of Laminates According to Matrix-to-Interphase Thickness Ratio The results of flexural testing of laminates having mullite or alumina matrices in different thickness ratios of matrix to interphase are presented above in Tables II and III. It is seen that as the matrix thickness was increased, the value of strength and work of fracture increased. In particular, the laminates which had a "bimodal" design showed noticeably higher strength and work of fracture. In mullite matrix laminates, the thickness ratio of 4:1 had a higher strength and work of fracture than did those of the laminate which had a 6:1 ratio, despite a thicker interphase. This is attributed to the effect of the addition of mullite powder to the platelet interphase. The effects of thickness ratio and mullite content were optimized in the bimodal mullite laminate, having alternating matrix-to-interphase ratios of 3:1 followed by 9:1. Graceful failure characteristics are observed in the corresponding load vs. deflection curves. FIG. 7 illustrates load-deflection curves of mullite-matrix laminate composites as a function of thickness ratio between the matrix and the interphase. The laminates have a 10–15 μm alumina platelets in the interphases and 0 and 1 vol % mullite content in the interphases. The bimodal design has an alternative combination of 3:1 ratio and 9:1 ratio (Table II).

Figure 8:
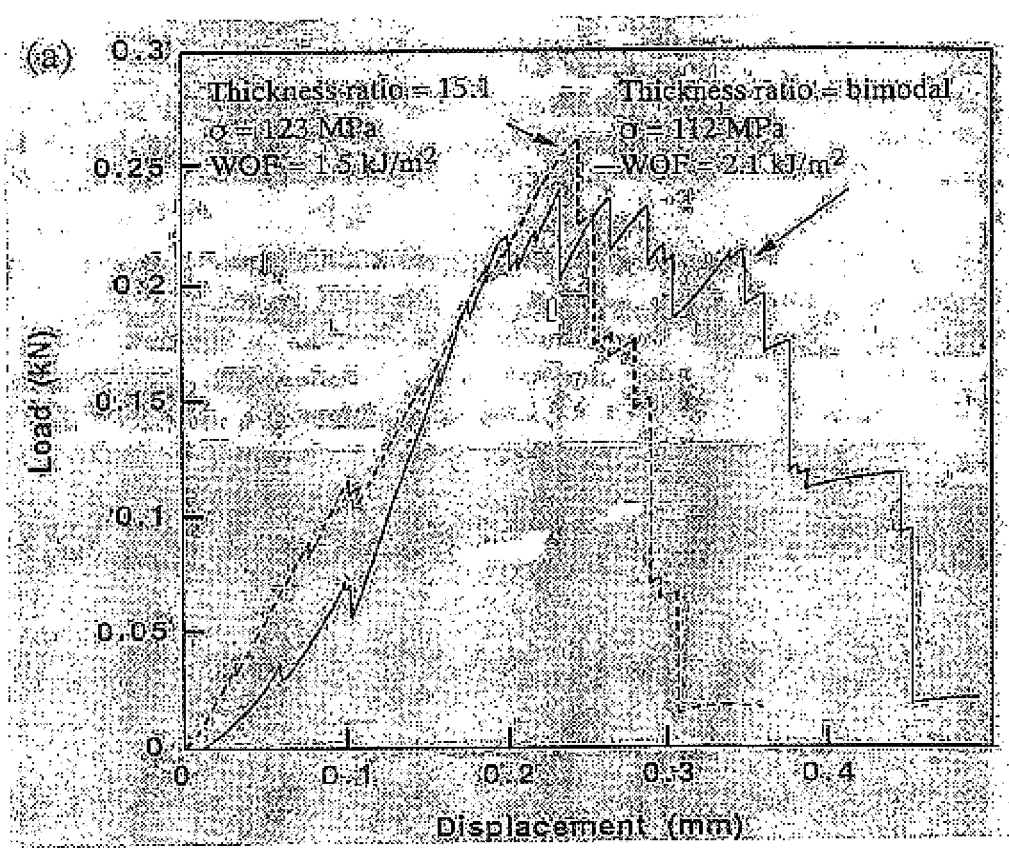
FIG. 8 is a graph illustrating load-deflection curves of alumina-matrix laminate composites, prepared according to the present invention, as a function of the thickness ratio between the matrix and interphase (Table III). The bimodal microstructure consisted of alternating layers of 12:1 and 5:1 matrix-to-interphase thickness ratios.
Figure 9A:
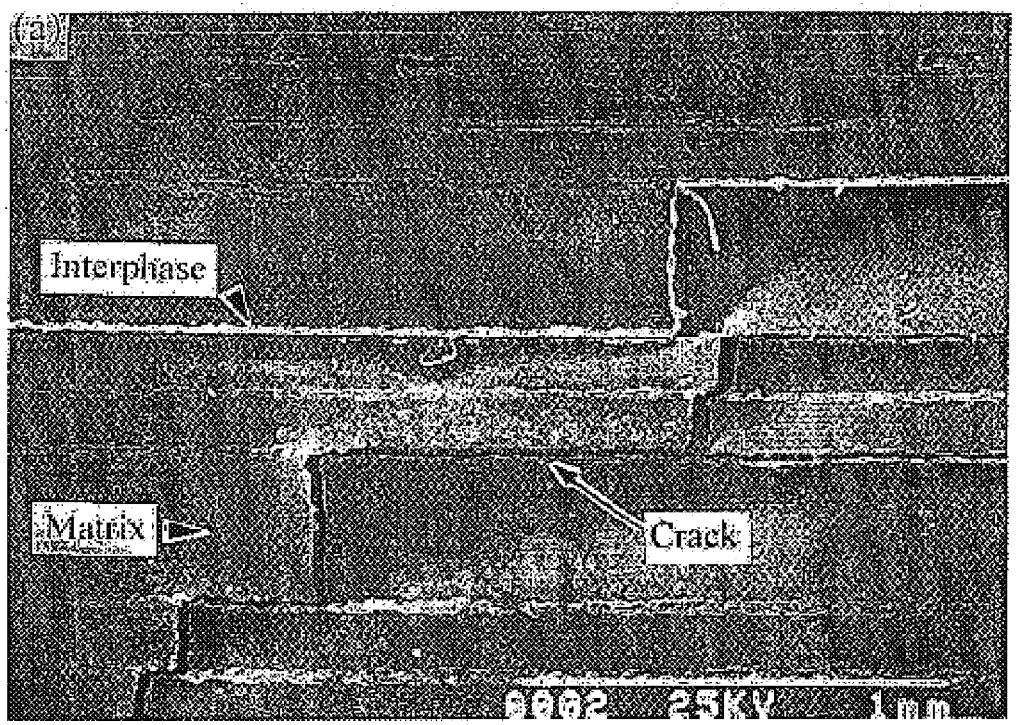
FIGS. 9a and 9b are scanned images of SEM micrographs for the failed side view of the alumina-matrix laminate composite, prepared according to the present invention. The laminate has 3 vol % mullite content in the interphase; 9a is a failed side view, and 9b is a magnified failed side view of the interphase.
Figure 9B:
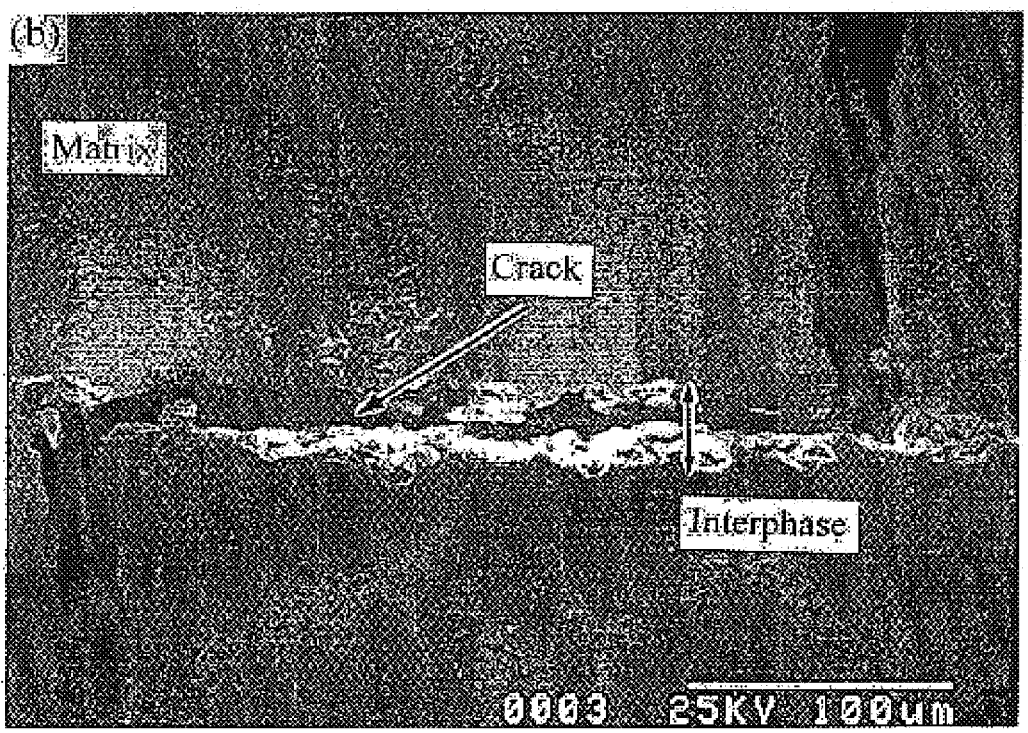

In order to increase the overall strength of the composite, the alumina matrix was chosen in a bimodal sequence of alternating 12:1 and 5:1 ratios, where the alternating regions of 12:1 and of 5:1 ratios were of equal thickness. When up to 3 vol % mullite was added to the interphase, the work of fracture notably increased. A highest strength of 112 MPa and work of fracture of 2.1 kJ/m$^2$ was observed. Again, graceful failure characteristics were observed in the load vs deflection curves for alumina (FIG. 8, Table III). FIG. 8 illustrates load-deflection curves of alumina-matrix laminate composites as a function of thickness ratio between matrix and interphase (Table III). The bimodal microstructure consisted of alternating layers of 12:1 and 5:1 matrix-to-interphase thickness ratios. FIG. 9 is a scanned image of a SEM micrograph illustrating the crack profile corresponding to the optimized load vs deflection curve of FIG. 8. It is seen that the deflected crack passed through the center of the porous interphase.

The alumina platelets provided an easy crack deflection route even in a thin platelet interphase of 15:1 alumina matrix-to-interphase thickness ratio. This confirmed that no reaction or densification occurred between the matrix and interphase, even though they consisted of the same material.

(4) Mechanical Behavior of Laminates according to Alumina Platelet Size

Figure 10:
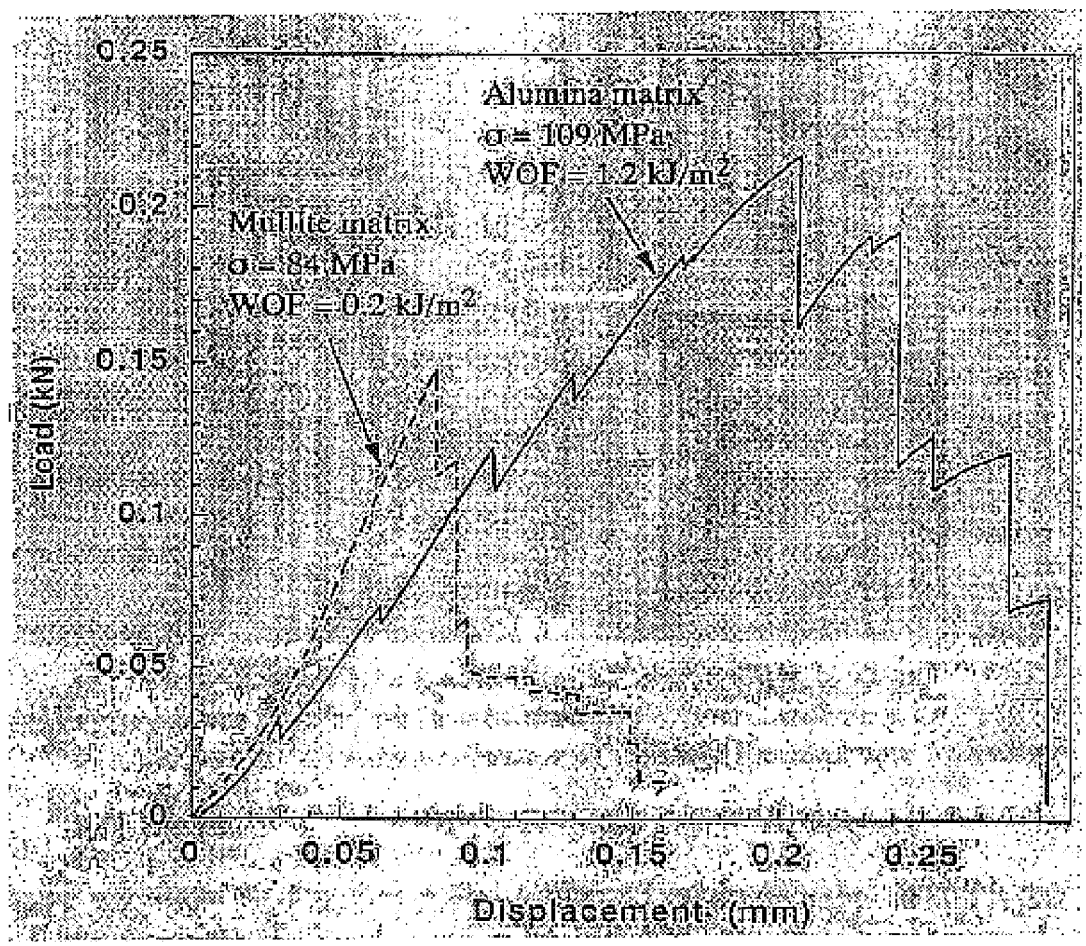
FIGS. 10a and 10b are graphs illustrating load-deflection curves of 10a mullite-matrix and 10b alumina-matrix laminate composites, prepared according to the present invention, having 5–10 μm platelet size in the interphases.
Figure 11A:
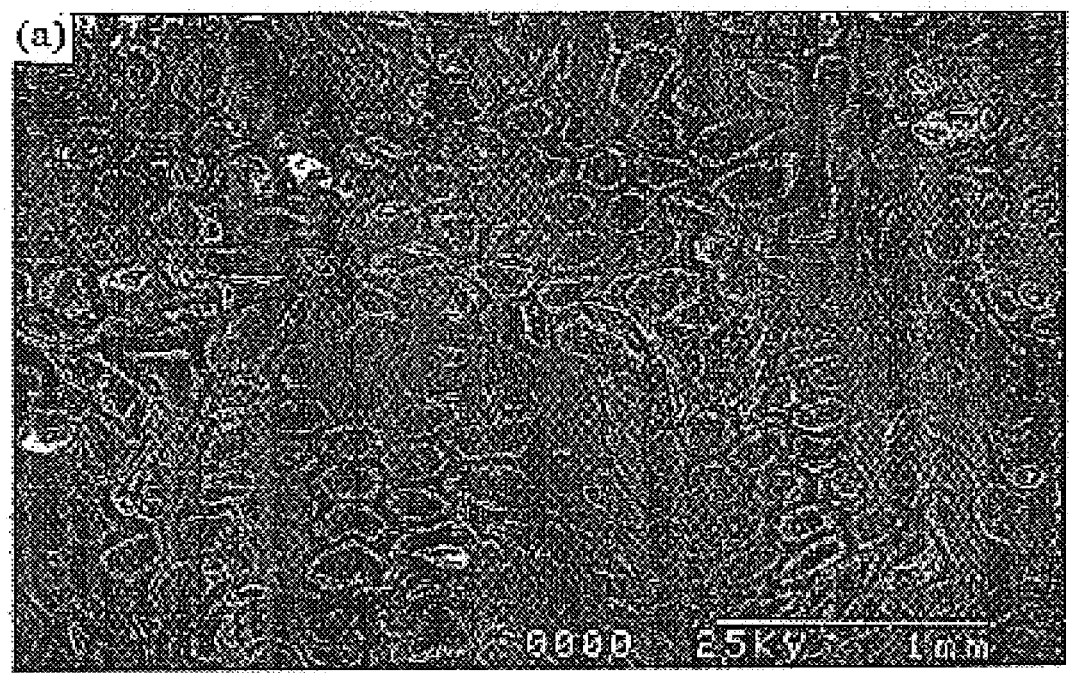
FIGS. 11a and 11b are scanned images of SEM micrographs of the as-sintered fibrous ceramic composite prepared according to the present invention; 11a is a cross section perpendicular to the fiber-running direction, and 11b is an enlargement of the cross section.
Figure 11B:
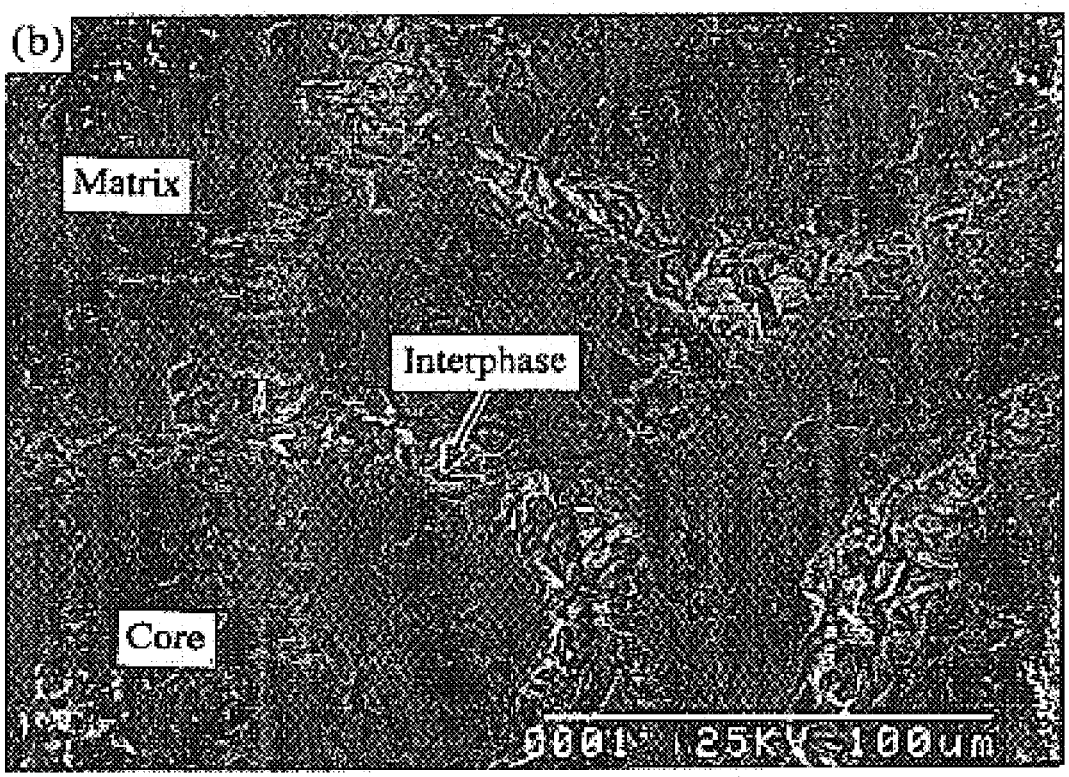

The results of flexural test for the laminates according to the alumina platelet size in the pure alumina interphase are listed in Tables IV and V. Correspondingly, the load vs deflection curves of the specimens which had 5–10 μm platelets in the interphases are shown in FIG. 10, which illustrates load-deflection curves of (a) mullite-matrix and (b) alumina-matrix laminate composites having 5–10 μm platelet size in the interphases. In the mullite-matrix laminate, which had alumina platelets of 5–10 μm in size, notable crack deflection did not occur at the interphase, and there was a lower work of fracture than in the 10–15 μm platelet mullite composite. In contrast, the alumina-matrix laminate which had 5–10 μm alumina platelets showed improved strength and work of fracture, in comparison with the 10–15 μm alumina platelet composite.

TABLE IV

Variation of Strength and Work of Fracture for Mullite Matrix Laminates according to Platelet Size in the Pure Alumina Platelet Interphase.

| Platelet size (μm) | 5–10 | 10–15 |
|---|---|---|
| Thickness ratio$ | 4:1 | 6:1 |
| Flexural strength (MPa) | 84 | 75 |
| Work of fracture (kJ/m$^2$) | 0.2 | 0.3 |

$matrix: interphase

TABLE V

Variation of Strength and Work of Fracture for Alumina Matrix Laminates according to Platelet Size in the Pure Alumina Platelet Interphase.

| Platelet size (μm) | 5–10 | 10–15 |
|---|---|---|
| Thickness ratio$ | 6:1 | 6:1 |
| Flexural strength (MPa) | 109 | 105 |
| Work of fracture (kJ/m$^2$) | 1.2 | 1.0 |

$matrix: interphase (5) Mechanical Behavior of Fibrous Ceramic Composite

Figure 12A:
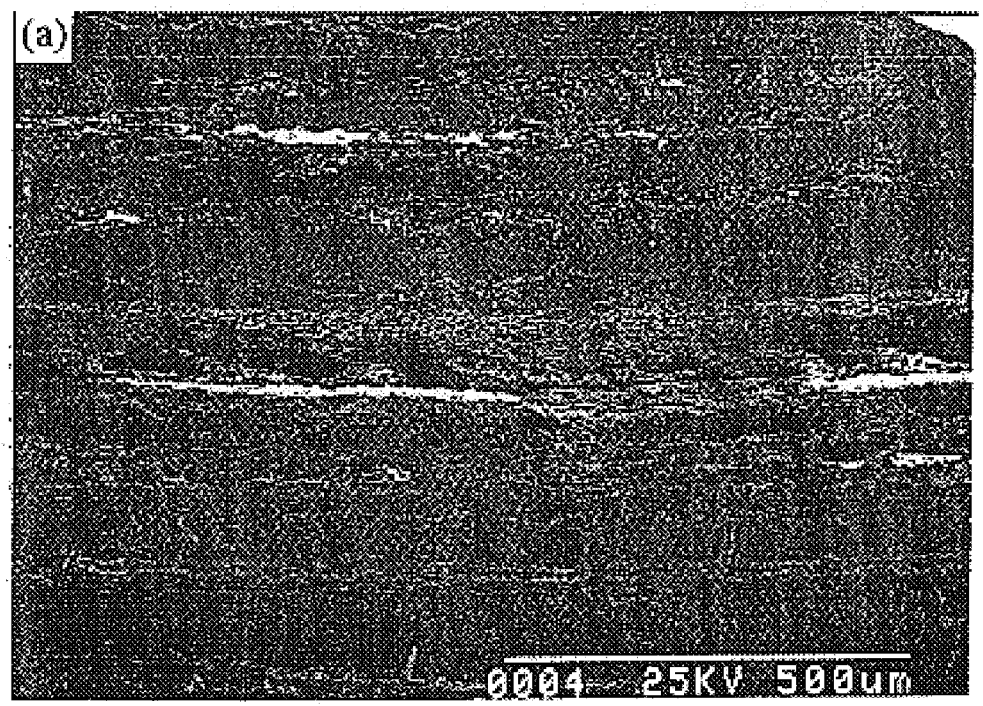
FIGS. 12a and 12b are scanned images of SEM micrographs of the as-sintered fibrous ceramic composite prepared according to the present invention; 12a is a cross section viewed parallel to the fiber-running direction, and 12b is an enlargement of the same cross section.
Figure 12B:
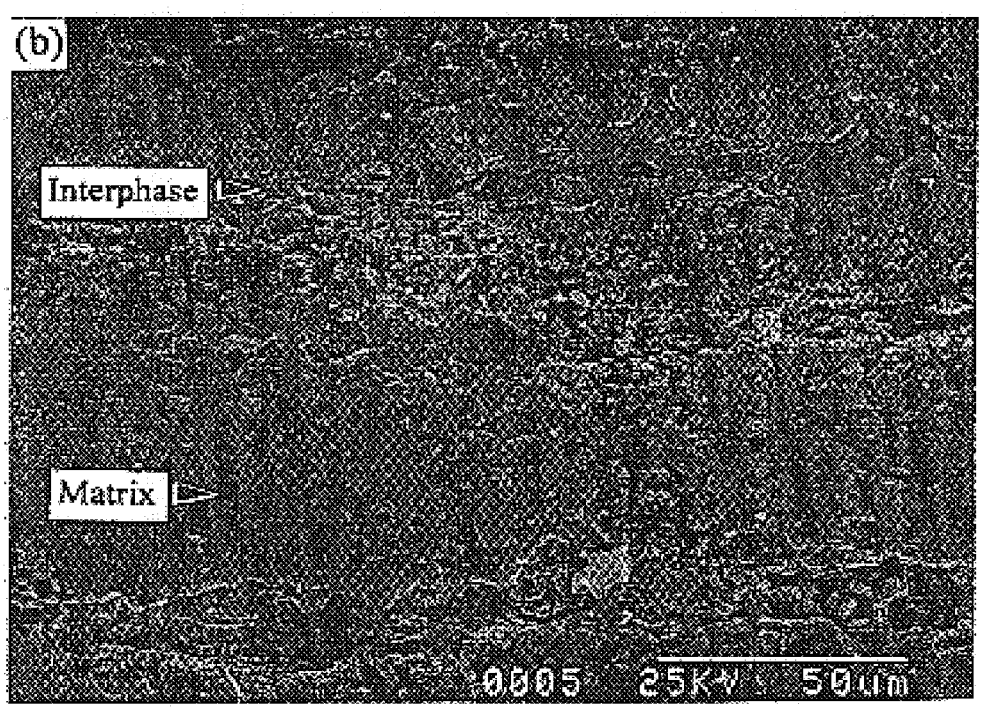

To make a tough, flaw-tolerant fibrous ceramic composite, the results of the mechanical test from the laminate composites were applied to the fibrous design. Alumina matrix and 5–10 μm size alumina platelets were used for the materials of the fibrous composite. The microstructures of the as-sintered fibrous ceramic composite are shown in FIGS. 11a, 11b, 12a, and 12b. The discontinuous, alumina platelet cell boundaries, which defined the matrix and reinforcing regions of alumina, are clearly revealed. The side view of the as-sintered fibrous ceramic composite showed the degree of uniformity in alignment of the as-extruded filaments (FIGS. 12a, 12b). The patterns are similar to the side view of the bimodally designed laminated composite.

This is one of the main advantages associated with this forming technique, i.e., the ability to create a heterogeneous microstructure with uniform cell-boundary thicknesses.

Figure 13:
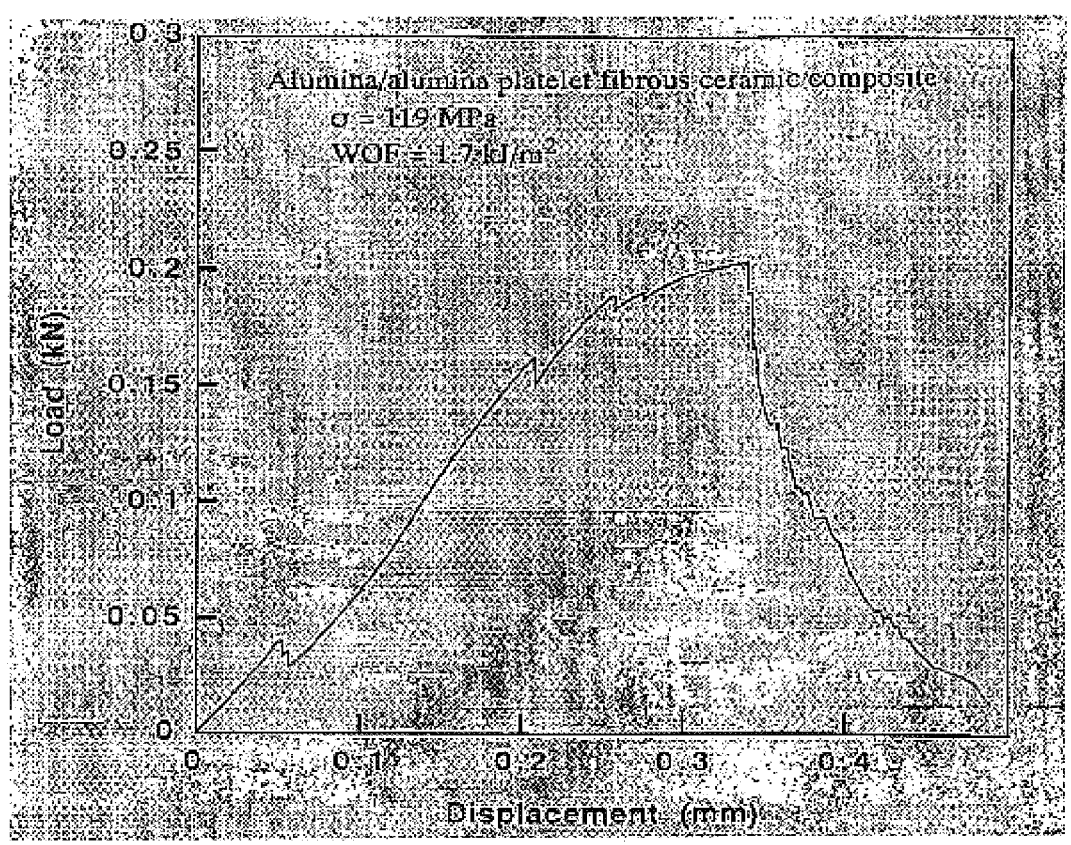
FIG. 13 is a graph illustrating the load-deflection curve of an alumina/alumina platelet fibrous matrix laminate, prepared according to the present invention.
Figure 14A:
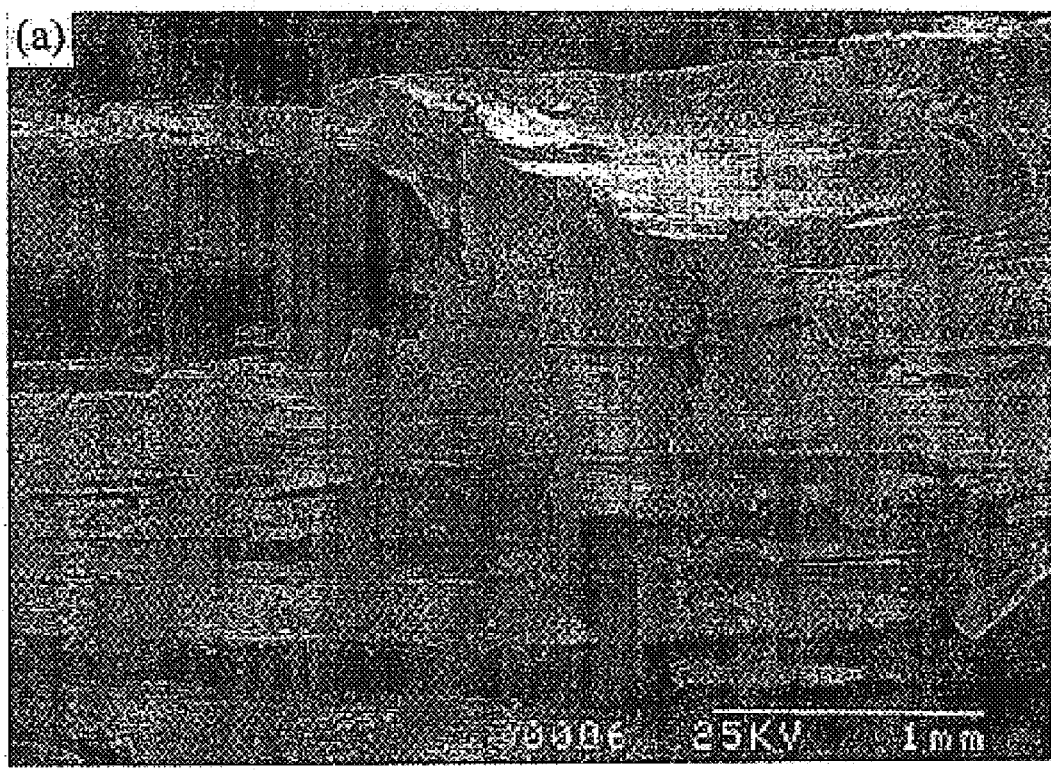
FIGS. 14a and 14b are scanned images of SEM micrographs for the fracture surface of fibrous ceramic composite; 14a is a side view of the fracture surface, and 14b is an enlargement of the pull-out alumina core.
Figure 14B:
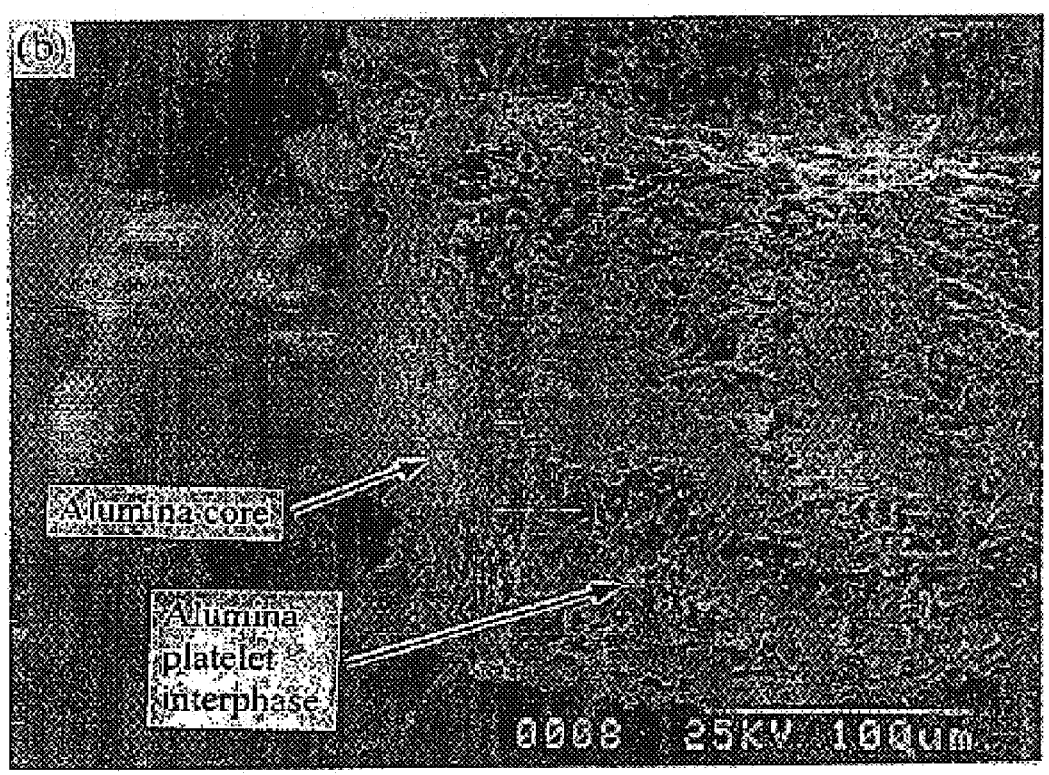

Flexural load vs. deflection curves for alumina/alumina platelet fibrous matrix laminates are seen in FIG. 13. The strength and work of fracture increased slightly in comparison with the alumina-matrix laminate, which had a bimodal thickness ratio. In contrast to the fracture curves of the laminates, the fibrous ceramics exhibited unusual and unexpected plastic-like behavior retaining significant load-bearing capability after the initial step-wise load drops. The failed specimens are shown in the SEM micrographs of FIGS. 14a and 14b. A slight curvature corresponding to permanent deformation and a non-brittle fracture surface with wood-like texture were observed in the fibrous specimen. Some alumina "fibrous cores" surrounded by alumina platelet interphase were detected at the fractured specimen, as illustrated in FIG. 14b. The pulled-out alumina core resulted from the fracture behavior, similar to the fiber pull-out effect in the fiber-reinforced ceramic composites.[42]

The fibrous monolith configuration of the present invention is versatile for uniform response to oncoming cracks perpendicular to the fibrous direction. The optimum ratio of core-to-interphase-to-matrix thickness for each of the alumina and mullite systems could be determined. However, the preliminary load vs deflection data (FIG. 13) does not show a sudden drop in strength after the ultimate tensile strength has been reached, rather a notable work of fracture (area under the curve) was obtained from such a composite. The corresponding SEM micrographs of FIGS. 14a and 14b suggest a wood-like fracture mechanism, which could also operate at elevated temperatures.

The measured mechanical properties indicated that at room temperature, interphases of suitable weak debonding strength were achieved using only platelets with only minimum (1 vol % –3 vol %) of matrix powder additions. While not intending to be bound by any theory, one could speculate that at high temperatures where transient creep may become an important issue, stronger and more rigid interphases may be required. Then the addition of matrix powders to the interphase may be beneficial to the overall long-term, high-temperature mechanical properties, in order to improve creep resistance.

The bimodal microstructure was prepared to intimately mix, on a microstructural level, regions of high strength (high matrix-to-interphase ratio), with regions of lower strength, but high toughness (low matrix-to-interphase ratio). FIG. 4 illustrates the mechanical properties of the two individual components that constitute bimodal microstructure, i.e., the strong matrix and interphase (containing 20 vol % mullite powder) exhibiting high strength, but low toughness (lack of graceful failure characteristics) and the composite containing only platelets in the interphase, which exhibited low overall strength, but characteristics of graceful failure and significant crack diversion along the interphase. This observation is consistent with the SEM micrographs of FIGS. 6a and 6b, where the 5 vol % powder in the platelet interphase shows brittle failure behavior (FIG. 6a), while the 3 vol % mullite additions to the platelet interphase produce noticeably more crack deflection along the interphase (FIG. 6b). Again, FIGS. 14a and 14b demonstrate more extensive crack deflection along the platelet interphase containing only 3 mol % mullite powder.

While not to be bound by any theory, it is hypothesized that after the crack passes through a thick matrix layer, it has high kinetic energy. The role of the several layers of low matrix-to-interphase ratio is to slow down the crack by causing it to deflect along a tortuous interphase path, where some of its energy is dissipated, hence imparting toughness to the composite data, such as for example illustrated in FIGS. 13 and 14a, 14b, for an alternating sequence of just one layer of 12:1 ratio followed by layers of 5:1 ratio (Table III) amply illustrate the potential for such a system to exhibit sustained toughness and flaw tolerance as well as a significant work of fracture. If this mechanism is coupled with an intrinsically strong matrix (e.g., yttria stabilized zirconia, 3 mol % $Y_2O_3$—$ZrO_2$ or "3Y-TZP") the absolute strength of the composite can be further enhanced.

While not intending to be bound by any theory, the mechanism of interphase debonding at an interface or within an interphase region for an all-oxide composite system significantly reduces brittleness and enhances the toughness of ceramic composites. In one form the toughened ceramic composite includes a suitably weak interphase through the use of relatively unsinterable material, for example, alumina platelets.

In one embodiment, the weak interphase includes alumina platelets having an average diameter of about 10 to about 15 $\mu$m (or about 5 to about 10 $\mu$m) and about 1 $\mu$m thick. The room temperature strength of the interphase can be adjusted by minor additions of ceramic powder.

In other embodiments, laminated composites of both mullite and of alumina and modified fibrous monoliths of alumina consisting of a triple layer "core-interphase-matrix" arrangement have been fabricated. Processing and microstructural design parameters can be varied to provide ceramic composites that exhibit viable high temperature, oxidation resistant, toughening mechanism in chemically compatible, oxide composites. In terms of chemistry, ceramic oxides, for example, alumina platelets, provide a simple and effective mechanism for debonding in air, independent of temperature, up to the melting point of the ceramic oxide or of the matrix.

In still yet other embodiments, the present invention provides, through intimate mixing of strength and toughness on a microstructural scale, optimally tailored bimodal microstructures. The bimodal microstructure can include one or more regions or layers of high matrix-to-interphase ratio (high strength) alternated with regions or layers of low matrix-to-interphase ratio (high toughness), consisting of one or several such thin layers. While not intending to be bound by any theory, it is hypothesized that after the crack passes through a thick matrix layer, it has high kinetic energy. The role of the several layers of low matrix-to-interphase ratio is to slow down the crack by causing it to deflect along a tortuous weak interphase path, where some of its energy is dissipated, hence imparting toughness to the composite.

The present invention contemplates modifications as would occur to those skilled in the art. It is also contemplated that processes embodied in the present invention can be altered, rearranged, substituted, deleted, duplicated, combined, or added to other processes as would occur to those skilled in the art without departing from the spirit of the present invention. In addition, the various stages, steps, procedures, techniques, phases, and operations within these processes may be altered, rearranged, substituted, deleted, duplicated, or combined as would occur to those skilled in the art. All publications, patents, and patent applications cited in this specification are herein incorporated by reference as if each individual publication, patent, or patent application was specifically and individually indicated to be incorporated by reference and set forth in its entirety herein.

Further, any theory of operation, proof, or finding stated herein is meant to further enhance understanding of the present invention and is not intended to make the scope of the present invention dependent upon such theory, proof, or finding.

REFERENCES

1. A. G. Evans, "Perspective on the Development of High-Toughness Ceramics," J. Am. Ceram. Soc., 73 [2] 187–206 (1990).
2. D. B. Marshall, B. N. Cox and A. G. Evans, "The Mechanics of Matrix Cracking in Brittle Fiber Composites," Acta Metall. 33 2013–2021 (1985).
3. R. W. Davidge, "Fiber-Reinforced Ceramics," Composites 18 [2] 92–98 (1987).
4. M. Y. He and J. W. Hutchinson, "Crack Deflection at an Interface Between Dissimilar Elastic Materials," Int. J. Solids Struct. 25 [9] 1053–1067 (1989).
5. A. G. Evans, M. Y. He and J. W. Hutchinson, "Interface Debonding and Fiber Cracking in Brittle Matrix Composites," J. Am. Ceram. Soc. 72 [12] 2300–2303 (1989).
6. J. W. Hutchinson and H. M. Jensen, "Models of Fiber Debonding and Pullout in Brittle Composites with Friction," Mech. Mater. 9 139–163 (1990).
7. R. J. Kerans, R. S. Hay, N. J. Pagano and T. A. Parthasarathy, "The Role of the Fiber-Matrix Interface in Ceramic Composites," Am. Ceram. Soc. Bull., 68 [2] 429–442 (1989).
8. A. G. Evans, "The Mechanical Performance of Fiber-Reinforced Ceramic Matrix Composites, Mater. Sci. Eng. A107, 227–239 (1989).
9. A. G. Evans and F. W. Zok, "Review of the Physics and Mechanics of Fiber-Reinforced Brittle Matrix Composites, J. Mater. Sci., 29 3857–3896 (1994).
10. W. J. Clegg, K. Kendall, N. M. Alford, D. Birchall and T. W. Button, "A Simple Way to Make Tough Ceramics," Nature, 347, 455–357 (1990).
11. W. J. Clegg, "The Fabrication and Failure of Laminar Ceramic Composites," Acta Metall., 40 [11] 3085–3093 (1992).
12. W. S. Coblenz, "Fibrous Monolithic Ceramic and Method for Production," U.S. Pat. No. 4,772,524, Sep. 20, 1988.
13. S. Baskaran, S. D. Nunn, D. Popovic and J. W. Halloran, "Fibrous Monolithic Ceramics: I, Fabrication, Microstructure, and Indentation Behavior," J. Am. Ceram. Soc., 76 [9] 2209–2216 (1993).
14. S. Baskaran, S. D. Nunn, D. Popovic and J. W. Halloran, "Fibrous Monolithic Ceramics: II, Flexural Strength and Fracture Behavior of the Silicon Carbide/Graphite System, "J. Am. Ceram. Soc., 76 [9] 2217–2224 (1993).
15. S. Baskaran and J. W. Halloran, "Fibrous Monolithic Ceramics: m, Properties and Oxidation Behavior of the Silicon Carbide/Boron Nitride System," J. Am. Ceram. Soc., 77 [5] 1249–1255 (1994).
16. D. Kovar, B. H. King, R. W. Trioe and J. W. Halloran, "Fibrous Monolithic Ceramics," J. Am. Ceram. Soc., 80 [10] 2471–2487 (1997).
17. P. E. D. Morgan and D. B. Marshall, "Functional Interfaces for Oxide/Oxide Composites," Mater. Sci. Eng., A162, 15–25 (1993).
18. P. E. D. Morgan, D. B. Marshall and R. M. Housley, "High Temperature Stability of Monazite-Alumina Composites," Mater. Sci. Eng. A195, 215–222 (1995).
19. P. E. D. Morgan and D. B. Marshall, "Ceramic Composites of Monazite and Alumina, J. Am. Ceram. Soc. 78 [6] 1553–1563 (1995). Erratum: J. Am. Ceram. Soc., 78{9} 2574 (1995).
20. "A Strong and Damage-Tolerant Oxide Laminate, "D. H. Kuo and W. M. Kriven, J. Am. Ceram. Soc. 80 [9] (1997) 2421–2424.
21. D. H. Kuo and W. M. Kriven, "Fracture of Multilayer Oxide Composites," J. Mater. Sci. and Eng. A241, 241–250. (1998).
22. D. H. Kuo and W. M. Kriven, "Oxide Laminates with High Strength and Work-of-Fracture," Mat. Res. Soc. Symp., *Interfacial Engineering for Optimized Properties*; edited by C. L. Briant, C. B. Carter, and E. L. Hall; vol. 458 477–488 (1997).
23. W. M. Kriven and D. H. Kuo, "A High Strength. Flaw Tolerant, Oxide Ceramic Composite," U.S. patent Ser. No. 08/797,453, issued February 1999.
24. W. M. Kriven and S. J. Lee, "Mullite/Cordierite Laminates with $\beta \rightarrow \alpha$ Cristobalite Transformation Weakened Interphases," Cer. Eng. and Sci. Proc. 19 [3] 305–316 (1998).
25. W. M. Kriven and S. J. Lee, "Toughening of Mullite/Cordierite Laminates by Transformation Weakening of $\beta$-Cristobalite Interphases," J. Am. Ceram. Soc., in press.
26. "Toughening of Titania by Transformation Weakening of Enstatite ($MgSiO_3$) Interphases," W. M. Kriven, C. M. Huang, D. Zhu, Y. Xu, Acta Metall. et Mater., submitted.
27. J. B. Davis, J. P. A. Löfvander, A. G. Evans, E. Bischoff and M. L. Emilianiu, "Fiber Coating Concepts for Brittle-Matrix Composites," J. Am. Ceram. Soc., 76 [5] 1249–1257.
28. T. May, K. Keller, T. A. Parthasarathy and J. Guth, "Fugitive Interface Coating in Oxide-Oxide Composites: A Viability Study," Ceram. Eng. Sci. Proc. 14 [9–10] 922–930 (1993).
29. C. G. Levi, J. Y. Yang, B. J. Dalgleish, F. W. Zok and A. G. Evans, "Processing and Performance of an All-Oxide Ceramic Composite," J. Am. Ceram. Soc., 81 [8] 2077–2086 (1998).
30. F. F. Lange, "Constrained Network Model for Predicting Densification Behavior of Composite Powders, J. Mater. Res., 2 [1] 59–65 (1987).
31. R. K. Bordia and G. W. Scherer, "On Constrained Sintering-I: Constitutive Model for a Sintering Body," Acta. Metall. et Mater. 36 [9] 2393–2397 (1988).
32. R. K. Bordia and G. W. Scherer, "On Constrained Sintering-II: Comparison of Constitutive Models, Acta. Metall. et Mater. 36 [9] 2399–2407 (1988).
33. R. K. Bordia and G. W. Scherer, "On Constrained Sintering-III: Rigid Inclusions," Acta. Metall. et Mater. 36 [9] 2411–2416 (1988).
34. O. Sudre and F. F. Lange, "Effect of Inclusions on Densification: I, Microstructural Development in an $Al_2O_3$ Matrix Containing a High Volume Fraction of $ZrO_2$ Incusions," J. Am. Ceram. Soc. 75 [3] 519–524 (1992).
35. O. Sudre, G. Bao, B. Fran, F. F. Lange and A. G. Evans, "Effect of Inclusions on Densification: II, Numerical Model," J. Am. Ceram. Soc., 75 [3] 525–531 (1992).
36. I. C. Cherian, M. D. Lehigh, I. Nettleship and W. M. Kriven, "Sterological Observations of Platelet-Reinforced Mullite- and Zirconia-Matrix Composites," J. Am. Ceram. Soc. 79 [12] 3273–3281 (1996).
37. I. K. Cherian, "Processing, Microstructure and Mechanical Properties of Alumina Platelet Reinforced 3Y-TZP and Mullite Composites," Ph. D. Thesis, W. M. Kriven, advisor. The University of Illinois at Urbana-Champaign, (1995).

38. S. Prochaska and F. J. Klug, "Infrared-transparent Mullite Ceramic," J. Am. Ceram. Soc., 66 [12] 874–880 (1983).
39. F. J. Klug, S. Prohazka and R. H. Doremus, "Alumina-Silica Phase Diagram in the Mullite Region," J. Am. Ceram. Soc., 70 [10] 750–759 (1987).
40. Dragan Popovic, W. Halloran, G. E. Hilmas, G. A. Brady, S. Sommers, A. Barda and G. Zywicki, "Process for Preparing Textured Ceramic Composites," U.S. Pat. No. 5,645,781, Jul. 8, 1997.
41. H. G. Tattersall and G. Tappin, "The Work of Fracture and Its Measurement in Metals, Ceramics and Other Materials," *J. Mater. Sci.*, 1 296–301 (1966).
42. "Combustion Synthesized β'-SiAlON Composites Reinforced with SiC Monofilaments," C. M. Huang, Y. Xu, D. Zhu and W. M. Kriven, *J. Mater. Sci. Eng.*, A188 (1994) 341–351.

What is claimed is:

1. A composite comprising:
   a first matrix including a first sintered ceramic material and
   an interphase region including randomly orientated ceramic oxide particles exhibiting high aspect ratio, wherein said interphase region is formed to include pores.
2. The composite of claim 1 wherein the first ceramic material is select from ceramic aluminides, ceramic borides, ceramic carbides, ceramic nitrides, ceramic oxides, ceramic silicides and mixtures thereof.
3. The composition of claim 1 wherein the first ceramic material is selected from the group consisting essentially of alumina, mullite, yttrium aluminate garnet, yttria stabilized zirconia, nickel aluminate, celsian, silicon aluminum oxynitrides, and chemically compatible mixtures thereof.
4. The composite of claim 1 wherein the ceramic oxide particles include alumina crystals.
5. The composite of claim 1 wherein the interphase region includes an additional ceramic component.
6. The composition of claim 5 wherein the additional ceramic component is the same as the first ceramic material.
7. The composite of claim 5 wherein the additional ceramic component is different than the first ceramic material.
8. The composite of claim 5 wherein the first ceramic material has an average first particle size and the additional ceramic component has an average second particle size smaller than the first particle size.
9. The composite of claim 5 wherein the first ceramic material has an average first particle size and the additional ceramic component has an average second particle size larger than the first particle size.
10. The composite of claim 1 provided in the form of a laminate wherein the first matrix defines a first layer and the interphase region defines a second layer.
11. The composite of claim 10 wherein the laminate is formed to include a bimodal or multimodal laminate.
12. The composite of claim 1 provided in the form of a fibrous monolith.
13. The composite of claim 12 wherein the fibrous monolith includes at least one core fiber formed of a ceramic material different from the first ceramic material.
14. The composite of claim 1 wherein the interphase region includes an amount of an additional ceramic component sufficient to enhance the strength of the composite.
15. The composite of claim 1 wherein the interphase region includes an amount of an additional ceramic component sufficient to enhance creep resistance of the composite.
16. A composite comprising:
   a first matrix including a first ceramic material and
   un interphase region including randomly orientated ceramic oxide particles, wherein said particles are substantially non-sinterable at a temperature of at least about 1,700° C. and have a substantially uniform shape, and wherein said interphase region is provided with voids.
17. The composition of claim 16 wherein the ceramic particles are substantially non-sinterable at a temperature of at least about 2,000° C.
18. The composite of claim 16 wherein the first ceramic material is selected from ceramic aluminides, ceramic borides, ceramic carbides, ceramic nitrides, ceramic oxides, ceramic silicides and mixtures thereof.
19. The composition of claim 16 wherein the first ceramic material is selected from the group consisting essentially of alumina, mullite, yttrium aluminate garnet, yttria stabilized zirconia, celsian and nickel aluminate.
20. The composite of claim 16 wherein the ceramic particle includes alumina crystals.
21. The composite of claim 16 wherein the interphase region includes an amount of an additional ceramic component sufficient to enhance the creep resistance of the composite.
22. The composite of claim 16 wherein the interphase region includes an amount of an additional ceramic component sufficient to enhance the strength of the composite.
23. The composite of claim 22 wherein the additional ceramic component is different than the first ceramic material.
24. The composite of claim 22 wherein the first ceramic material has an average first particle size and the additional ceramic component has an average second particle size smaller than the first particle size.
25. The composite of claim 22 wherein the first ceramic material has an average first particle size and the additional ceramic component has an average second particle size larger than the first particle size.
26. The composite of claim 16 provided in the form of a laminate wherein the first matrix defines a first layer and the interphase region defines a second layer.
27. The composite of claim 26 wherein the laminate is provided in the form of a bimodal laminate.
28. The composition of claim 26 wherein the laminate is provided in the form of a multimodal laminate.
29. The composite of claim 16 provided in the form of a fibrous monolith.
30. The composite of claim 29 wherein the fibrous monolith includes at least one core fiber formed of material different from the first ceramic material.
31. A composite comprising:
   a first matrix including a first ceramic material and
   an interphase region including randomly orientated ceramic oxide platelets and an additional ceramic component having a particle size smaller than or equal to the size of the ceramic oxide platelets and wherein said interphase region exhibits permanent porosity.
32. The composite of claim 31 wherein the first ceramic material is selected from ceramic aluminides, ceramic borides, ceramic carbides, ceramic nitrides, ceramic oxides, ceramic silicides and mixtures thereof.
33. The composition of claim 31 wherein the first ceramic material is selected from the group consisting essentially of alumina, mullite, yttrium aluminate garnet, yttria stabilized zirconia, celsian and nickel aluminate.
34. The composite of claim 31 wherein the ceramic oxide particles include alumina crystals.

35. The composite of claim 31 wherein the additional ceramic component is different from the first ceramic material.

36. The composite of claim 31 wherein the first ceramic material has an average first particle size and the additional ceramic component has an average second particle size smaller than the first particle size.

37. The composite of claim 31 wherein the first ceramic material has an average first particle size and the additional ceramic component has an average second particle size larger than the first particle size.

38. The composite of claim 31 provided in the form of a laminate wherein the first matrix defines a fist layer and the interphase region defines a second layer.

39. The composite of claim 38 wherein the laminate is formed to include a bimodal laminate.

40. The composite of claim 38 wherein the laminate is formed to include a multimodal laminate.

41. The composite of claim 31 provided in the form of a fibrous monolith.

42. The composite of claim 41 wherein the fibrous monolith includes at least one core fiber formed of a ceramic material different from the first ceramic material.

43. A monolith comprising:

a first matrix including a first sintered ceramic material an interphase region including randomly orientated ceramic platelets, wherein said platelets are substantially non-sinterable at a temperature of at least about 1,700° C. and wherein said interphase region is provided with voids.

44. The monolith of claim 43 wherein the first sintered ceramic material is selected from ceramic aluminides, ceramic borides, ceramic carbides, ceramic nitrides, ceramic oxides, ceramic silicides and mixtures thereof.

45. The monolith of claim 43 wherein the first sintered ceramic material is selected from the group consisting essentially of alumina, mullite, yttrium aluminate garnet, yttria stabilized zirconia, celsian and nickel aluminate.

46. The monolith of claim 43 wherein the interphase region includes an amount of an additional ceramic component sufficient to enhance the creep resistance of the composite.

47. The monolith of claim 43 wherein the interphase region includes an amount of an additional ceramic component sufficient to enhance the strength of the monolith.

48. The monolith of claim 47 wherein the additional ceramic component is different than the first sintered ceramic material.

49. The monolith of claim 47 wherein the additional ceramic component is the same as the first sintered ceramic material.

50. The monolith of claim 43 provided in the form of a biomodal laminate.

51. The monolith of claim 43 provided in the form of a multimodal laminate.

52. The monolith of claim 43 including at least one core fiber formed of material different from the first sintered ceramic material.

53. The monolith of claim 43 wherein the ceramic platelets are composed of alumina oxide platelets.

54. The monolith of claim 43 provided as a fibrous monolith.

* * * * *